US009024991B2

(12) United States Patent
Ugajin et al.

(10) Patent No.: US 9,024,991 B2
(45) Date of Patent: May 5, 2015

(54) LASER MARKER

(71) Applicant: Nidec Copal Corporation, Tokyo (JP)

(72) Inventors: Tomohisa Ugajin, Tokyo (JP); Ryoichi Umezawa, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 13/903,202

(22) Filed: May 28, 2013

(65) Prior Publication Data

US 2013/0314487 A1 Nov. 28, 2013

(30) Foreign Application Priority Data

May 28, 2012 (JP) ................................ 2012-121048
Feb. 8, 2013 (JP) ................................ 2013-023332

(51) Int. Cl.
*B41J 2/45* (2006.01)
*B41J 2/44* (2006.01)
*B41J 2/32* (2006.01)
*B41J 2/315* (2006.01)
*G01D 15/10* (2006.01)

(52) U.S. Cl.
CPC ...................................... *B41J 2/442* (2013.01)

(58) Field of Classification Search
CPC ............ B41J 2/442; B41M 5/24; B41M 5/26; B41M 5/262; B41M 5/265; B41M 5/267; B23K 26/00; B23K 26/0033; B23K 26/0036
USPC ......................................... 347/172–223, 262
See application file for complete search history.

(56) References Cited

U.S. PATENT DOCUMENTS

| | | | | | |
|---|---|---|---|---|---|
| 4,527,060 | A * | 7/1985 | Suzuki et al. | | 250/585 |
| 4,661,708 | A * | 4/1987 | Agano | | 250/585 |
| 4,765,656 | A | 8/1988 | Becker et al. | | |
| 5,539,487 | A | 7/1996 | Taguchi et al. | | |
| 5,697,006 | A | 12/1997 | Taguchi et al. | | |
| 5,724,758 | A | 3/1998 | Gulick, Jr. | | |
| 5,729,332 | A | 3/1998 | Fogel et al. | | |
| 6,087,054 | A | 7/2000 | Cobb et al. | | |
| 6,191,802 | B1 * | 2/2001 | Kessler | | 347/225 |
| 6,249,384 | B1 | 6/2001 | Cobb et al. | | |
| 6,392,683 | B1 * | 5/2002 | Hayashi | | 347/224 |
| 7,277,110 | B2 * | 10/2007 | Zarem et al. | | 347/185 |
| 2011/0284509 | A1 * | 11/2011 | Kreuter | | 219/121.67 |
| 2012/0132630 | A1 * | 5/2012 | Kreuter et al. | | 219/121.72 |

FOREIGN PATENT DOCUMENTS

| | | | |
|---|---|---|---|
| JP | 62-161596 | A | 7/1987 |
| JP | 05-232605 | A | 9/1993 |
| JP | 07-281327 | A | 10/1995 |
| JP | 09-43752 | A | 2/1997 |
| JP | 2012-013991 | A | 1/2012 |

* cited by examiner

*Primary Examiner* — Jannelle M Lebron
*Assistant Examiner* — Jeremy Bishop
(74) *Attorney, Agent, or Firm* — Troutman Sanders LLP

(57) ABSTRACT

A laser marker includes a laser irradiation device that irradiates a card with a laser beam; a base unit that supports the card; a drive roller that is provided in the base unit and that is in contact with a lower surface of the card; a rotation member that rotates between a holding position and a withdrawn position, the holding position being a position in which the rotation member holds the card in cooperation with the base unit, the withdrawn position being outside of an optical path of the laser beam; a pinch roller that is provided in the rotation member, that is in contact with an upper surface of the card, and that transports the card in cooperation with the drive roller; and a prism that is fixed to the rotation member and that transmits and refracts the laser beam when the rotation member is in the holding position.

6 Claims, 20 Drawing Sheets

2B

LASER MARKER

CROSS REFERENCES TO RELATED APPLICATIONS

The present invention contains subject matter related to and the present application claims priority under 35 U.S.C. §119 to Japanese Patent Application No. 2012-121048 filed in the Japan Patent Office on May 28, 2012 and Japanese Patent Application No. 2013-023332 filed in the Japan Patent Office on Feb. 8, 2013, the entire contents of which are incorporated herein by reference.

BACKGROUND OF THE INVENTION

1. Field of the Invention

The present invention relates to a laser marker for printing an image on a sheet by irradiating the sheet with a laser beam.

2. Description of the Related Art

To date, there have been cards having a lenticular portion that allows an image that is visible to change as the card is viewed from different angles. The lenticular portion includes a lenticular image that is printed on the card and a transparent lenticular lens that has a sheet-like shape and that covers the lenticular image. The lenticular image of the lenticular portion is printed by irradiating a card with a laser beam at an angle through a lenticular lens that has been formed on a surface of the card. Japanese Unexamined Patent Application Publication No. 62-161596 describes a method of printing a lenticular image on a card. In the method, the card is tilted when the card is irradiated with a laser beam.

SUMMARY OF THE INVENTION

In order to use the method of printing a lenticular image described above, it is necessary to provide a mechanism for tilting a sheet, such as a card, when printing a lenticular image. Therefore, a laser marker for irradiating a sheet with a laser beam is increased in size.

It is an object of the present invention to provide a laser marker that is capable of printing an ordinary image and a lenticular image by using a laser beam and that can be reduced in size.

Moreover, in order to use the method of printing a lenticular image described above, when printing a lenticular image, a lenticular portion is directly irradiated with a laser beam in a state in which a sheet such as a card is tilted. Images formed in a lenticular portion of a sheet by directly irradiating the lenticular portion with a laser beam has a density that is considerably higher (darker) than that of images formed on a non-lenticular portion of the sheet. As a result, the contrast between the images is unclear. This occurs because the lenticular portion and the non-lenticular portion are irradiated with laser beams having the same power.

Therefore, in order to form clear images in a lenticular portion, it is necessary to form images in the lenticular portion by using a laser beam having a considerably lower power. However, lasers generally have a property that the power of a laser beam is unstable in a low power range. As a result, a problem arises in that the quality of an image formed in the lenticular portion is unstable, that is, the image may be clear in some places but may be unclear in other places.

It is another object of the present invention to provide a laser marker that can easily make a clear image in a lenticular portion.

According to a first aspect of the present invention, there is provided a laser marker for printing an image on a sheet by irradiating the sheet with a laser beam. The laser marker includes a laser irradiation unit that irradiates the sheet with the laser beam; a base unit that supports the sheet; a drive roller that is provided in the base unit and that is in contact with a first surface of the sheet; a movable member that rotates between a sheet holding position and a withdrawn position, the sheet holding position being a position in which the movable member holds the sheet in cooperation with the base unit, the withdrawn position being a position outside of an optical path of the laser beam; a pinch roller that is provided in the movable member, that is in contact with a second surface of the sheet, and that transports the sheet in cooperation with the drive roller; and a prism that is fixed to the movable member and that transmits and refracts the laser beam when the movable member is in the sheet holding position. The laser irradiation unit irradiates the sheet with the laser beam when the movable member is in the sheet holding position and when the movable member is in the withdrawn position.

With the laser marker, when the movable member is in the sheet holding position, the drive roller and the pinch roller can cooperate to adjust the position of the sheet, the sheet can be irradiated with a laser beam at an angle by refracting the laser beam using the prism, which is fixed to the movable member, and thereby a lenticular image can be printed. When the movable member, to which the prism is fixed, is in the withdrawn position, the sheet can be irradiated with a laser beam that has not passed through the prism, and thereby an ordinary image can be printed on the sheet. Thus, a lenticular image and an ordinary image can be printed without tilting the sheet. Therefore, a mechanism for tilting the sheet is not necessary, and the laser marker can be reduced in size. In particular, the movable member rotates between the sheet holding position and the withdrawn position so as to move the prism between a position in the optical path of a laser beam and a position outside of the optical path of the laser beam. Therefore, a mechanism for moving the movable member can be easily simplified, and the laser marker can be further reduced in size. Moreover, when the movable member rotates so as to withdraw the prism to a position outside of the optical path of a laser beam, the pinch roller is also withdrawn to a position outside of the optical path of the laser beam. Therefore, an ordinary image can be printed without being hindered by the pinch roller. Because one movable member is used to withdraw the pinch roller and to withdraw the prism, the laser marker can be further reduced in size.

The prism may include a plurality of prism portions that refract the laser beam in different directions, the plurality of prism portions being arranged side by side along a transport direction in which the pinch roller transports the sheet. In this case, by only transporting the sheet in one direction using a simple mechanism having the drive roller and the pinch roller, the sheet can be quickly moved to a position corresponding to that of each of the prism portions. Thus, the sheet can be irradiated with laser beams that have passed through the prism portions and that have been refracted in different directions, and therefore a lenticular image whose appearance changes to a large degree can be quickly printed. Because a simple mechanism having the drive roller and the pinch roller can be used as a mechanism for transporting the sheet, the laser marker can be reduced in size.

The movable member may be provided in a plurality, the plurality of movable members may be disposed so that the sheet holding positions thereof overlap each other, and the plurality of movable members may rotate in different directions. In this case, by rotating the movable members, a movable member that is placed in the overlapping sheet holding position can be changed. By changing the movable member placed in the overlapping sheet holding position, a plurality of prisms can be placed in the optical path of the laser beam in turn, and therefore a lenticular image whose appearance changes to a large degree can be printed. Because the overlapping sheet holding position is used to print an image when each of the prisms is located in the optical path of the laser beam, the laser marker can be reduced in size.

According to a second aspect of the present invention, there is provided a laser marker for forming an image in a lenticular portion of a sheet by irradiating the sheet with a laser beam, the lenticular portion allowing an image that is visible to change as the sheet is viewed from different angles. The laser marker includes a laser irradiation device that irradiates the lenticular portion of the sheet with the laser beam; and a neutral density filter that is disposed between the lenticular portion and the laser irradiation device, the neutral density filter transmitting the laser beam.

With the laser marker, when forming an image in the lenticular portion, the power of the laser beam can be attenuated by the neutral density (ND) filter. Therefore, the laser can be used in a high power range, in which the power of the laser is stable and a clear image can be easily formed, instead of in a low power range, in which the power of the laser tends to be unstable. In addition, also when printing an image in a non-lenticular portion of the sheet, it is preferable that the laser be used in a high power range. Therefore, images can be formed in the lenticular portion and the non-lenticular portion with the same laser power. As a result, it is not necessary to change the laser power every time when the printing portion is switched between the lenticular portion and the non-lenticular portion, and therefore printing can be performed rapidly. This is particularly effective in printing an image whose recognizability depends on the contrast of the image, such as a facial portrait.

The laser marker may further include a prism that is disposed between the lenticular portion and the laser irradiation device, the prism causing the lenticular portion to be irradiated with the laser beam at an angle, and the neutral density filter may be disposed on a laser-beam-incident surface of the prism or on a laser-beam-exit surface of the prism.

With this structure, it is not necessary to tilt the sheet when forming an image in the lenticular portion, and therefore the image can be formed stably.

With the present invention, a laser marker that is capable of printing an ordinary image and a lenticular image and that can be reduced in size can be provided.

Moreover, with the present invention, a clear image can be easily formed in a lenticular portion.

DESCRIPTION OF THE PREFERRED EMBODIMENTS

Hereinafter, preferred embodiments of a laser marker according to the present invention will be described in detail with reference to the drawings.

First Embodiment

FIGS. 1 to 6 illustrate a laser marker 1 for printing a lenticular image and an ordinary image on a card C1, which is an example of a sheet. The lenticular image is formed in a lenticular portion P1 of the card C1. The lenticular portion P1 is a portion of the card C1 on which a lenticular lens is formed. The lenticular lens is transparent and has a sheet-like shape. The lenticular image is formed under the lenticular lens. The laser marker 1 includes a laser irradiation device 1B and a housing 1A. The laser irradiation device 1B emits a laser beam from a head 1*a*, which faces downward. The housing 1A is disposed in an upper part of the laser marker 1 and houses the laser irradiation device 1B. The laser irradiation device 1B can freely move a point that is irradiated with a laser beam in the horizontal direction by moving a scan mirror. A transport device 2 is disposed below the laser irradiation device 1B in the housing 1A. The transport device 2 transports the card C1 so that images can be printed on the card C1 with a laser beam emitted from the laser irradiation device 1B.

Figure 1:
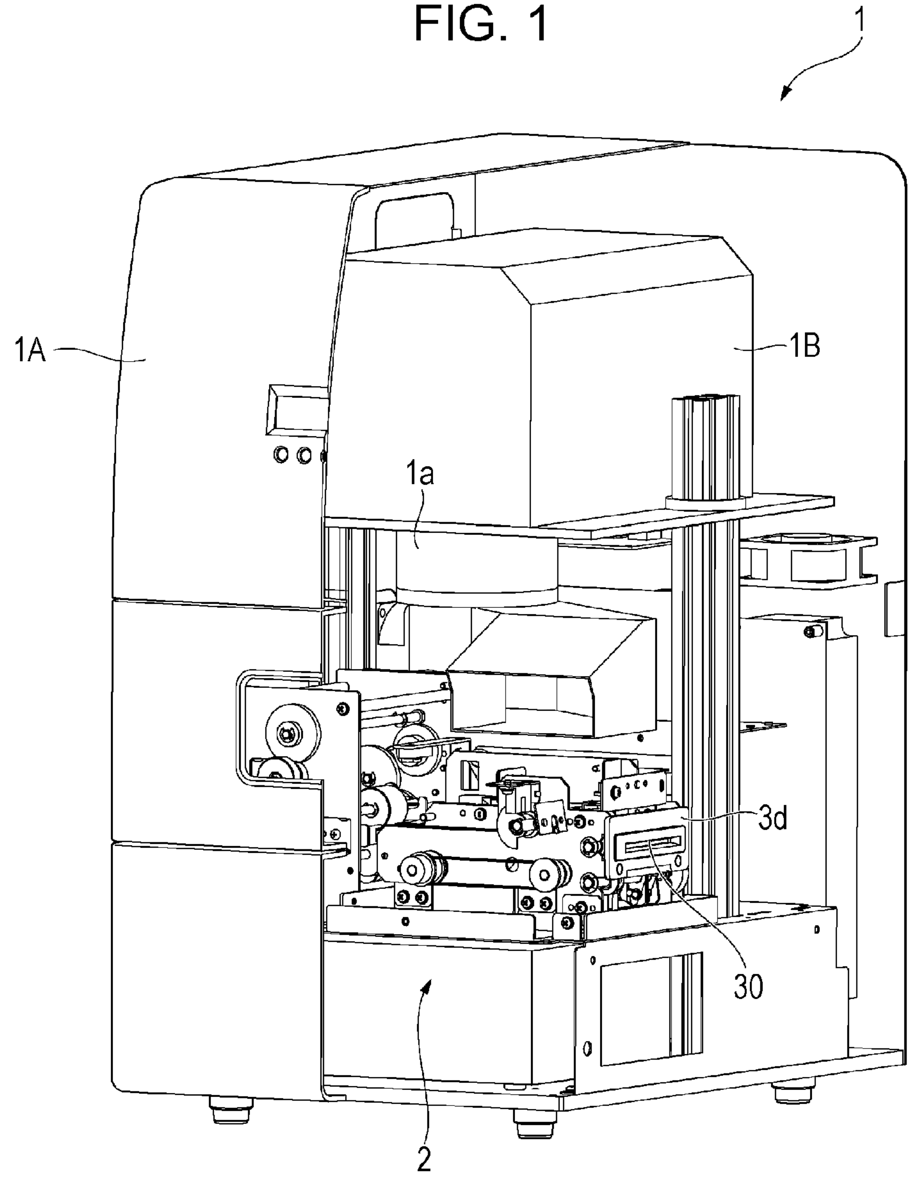
FIG. 1 is a perspective view illustrating a laser marker according to a first embodiment of the present invention.
Figure 2:
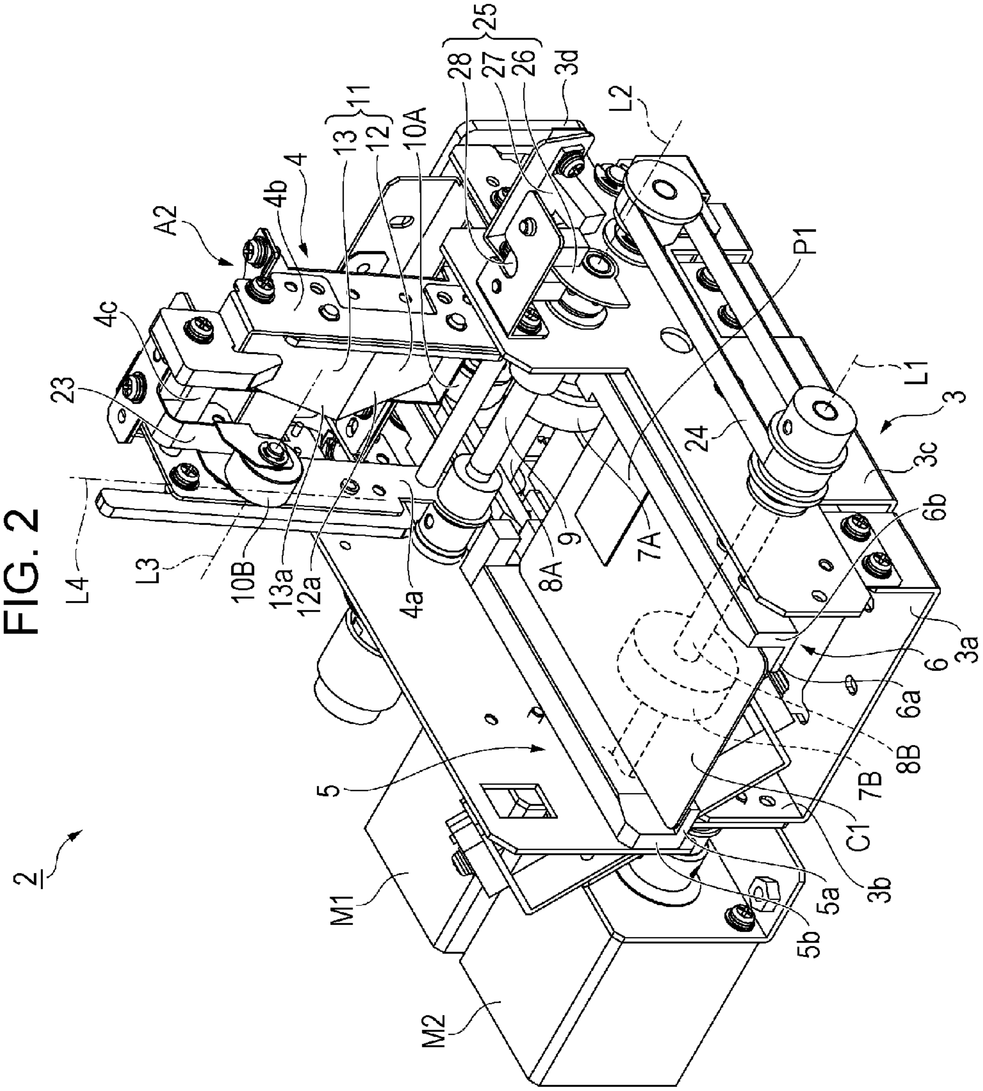
FIG. 2 is a perspective view illustrating a transport device in FIG. 1.
Figure 3:
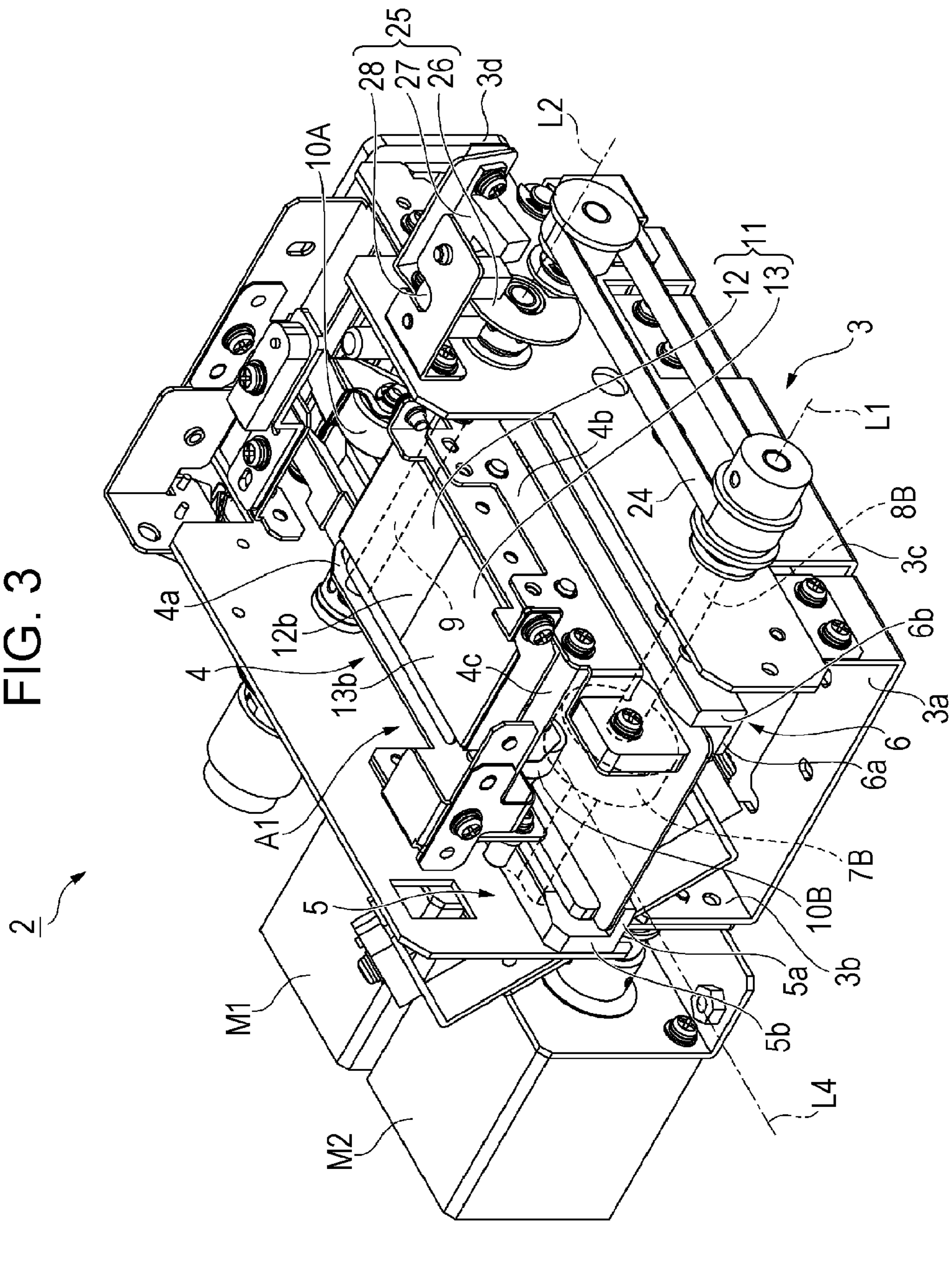
FIG. 3 is a perspective view illustrating a rotation member in FIG. 2 in a holding position.
Figure 4:
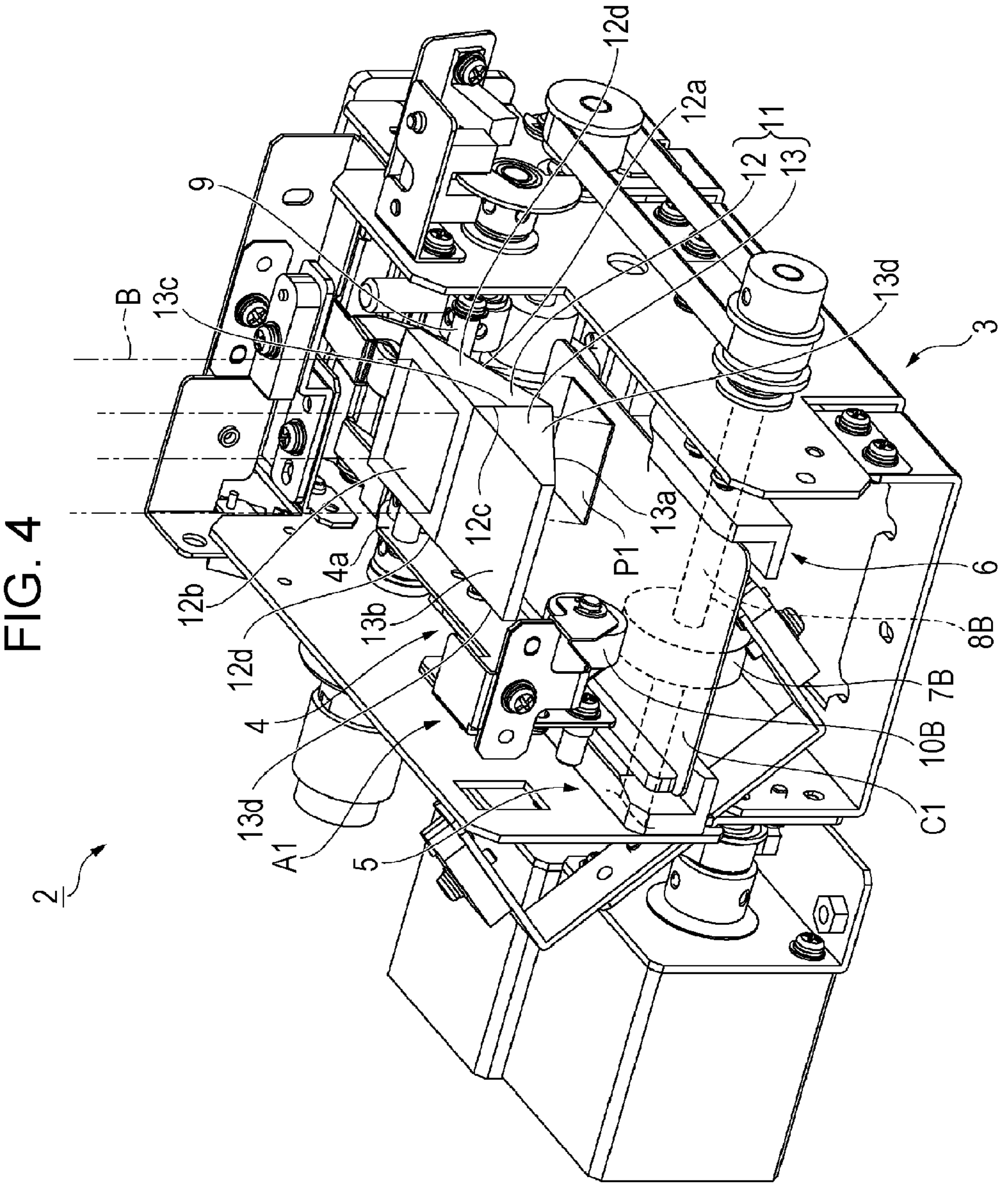
FIG. 4 is a perspective view illustrating a state in which a lenticular image is being printed in a lenticular portion by using a first prism portion in FIG. 3.

As illustrated in FIGS. 2 to 4, the transport device 2 includes a base unit 3 and a rotation member 4 (movable member). The base unit 3 is disposed so as to be substantially horizontal and supports the card C1. The rotation member 4 is connected to an upper portion of the base unit 3 so as to be rotatable. The rotation member 4 rotates between a holding position A1 and a withdrawn position A2. In the holding position A1, the rotation member 4 holds the card C1 in cooperation with the base unit 3. In the withdrawn position A2, the rotation member 4 is located outside of the optical path of a laser beam.

The base unit 3 includes a base plate 3*a*, side plates 3*b* and 3*c*, and a vertical cover plate 3*d*. The base plate 3*a* has a rectangular shape and is disposed in the housing 1A so as to be horizontal. The side plates 3*b* and 3*c* stand vertically on the long sides of the base plate 3*a*. The cover plate 3*d* is disposed adjacent to one of the short sides of the base plate 3*a* and extends perpendicular to the side plates 3*b* and 3*c*. A card slot 30 (see FIG. 1) is formed in the cover plate 3*d*. The card C1 is inserted into the card slot 30 substantially horizontally. In the following description, it will be assumed that the card C1 is inserted toward the "front" side; and the terms "back", "left", and "right" refer to the sides with respect to the "front" side.

A rotation shaft 8A is disposed inward from and below the card slot 30 so as to extend in the left-right direction. The rotation shaft 8A extends through shaft bearing holes that are attached to the side plates 3*b* and 3*c*. The rotation shaft 8A is connected to a motor M1 through a timing belt that is disposed outward from the side plate 3*b*. A drive roller 7A is attached to the rotation shaft 8A. The drive roller 7A is in contact with a lower surface of the card slot 30. A pinch roller 10A is disposed above the drive roller 7A. The pinch roller 10A is rotatable around an axis that is substantially parallel to the rotation shaft 8A.

The pinch roller 10A is urged toward the drive roller 7A by a plate spring or the like. When the card C1 is inserted into the card slot 30, the pinch roller 10A presses the card C1 against the drive roller 7A. In this state, when the motor M1 rotates the drive roller 7A through the rotation shaft 8A, the card C1 is moved in the front-back direction as the drive roller 7A rotates, and the pinch roller 10A is rotated due to the movement of the card C1. Thus, the drive roller 7A and the pinch roller 10A cooperate to transport the card C1 in the front-back direction.

A pair of guide members 5 and 6 are disposed in front of the drive roller 7A so as to extend in the front-back direction. The guide members 5 and 6 are respectively attached to upper edges of the side plates 3*b* and 3*c*. The guide member 5 includes a support plate 5*a* and a guide wall 5*b*. The support plate 5*a* supports the right side of the card C1. The guide wall 5*b* protrudes upward from the support plate 5*a* and extends along the right side of the card C1. The guide member 6 includes a support plate 6*a* and a guide wall 6*b*. The support plate 6*a* supports the left side of the card C1. The guide wall 6*b* protrudes upward from the support plate 6*a* and extends along the left side of the card C1. The guide member 6 is urged toward the guide member 5 by a spring. Thus, the card C1 can be held between the guide wall 5*b* and the guide wall 6*b* without gaps therebetween, and therefore the position of the card C1 in the left-right direction can be determined with high accuracy. The guide member 5 and the guide member 6 cooperate to guide the card C1 along the front-back direction.

A rotation shaft 8B is disposed below the guide members 5 and 6 so as to extend parallel to the rotation shaft 8A. The rotation shaft 8B extends through shaft bearing holes that are attached to the side plates 3*b* and 3*c*. The rotation shaft 8B is connected to the rotation shaft 8A through a timing belt 24 that is disposed outward from the side plate 3*c*. A drive roller 7B is attached to the rotation shaft 8B. The drive roller 7B is disposed nearer to the guide member 5 than to the guide member 6 and is in contact with the lower surface of the card C1.

A rotation shaft 9 is disposed behind the guide members 5 and 6 so as to extend parallel to the rotation shafts 8A and 8B. The rotation shaft 9 extends through shaft bearing holes that are attached to the side plates 3*b* and 3*c*. The rotation member 4 is fixed to the rotation shaft 9. The rotation member 4 includes a pair of frames 4*a* and 4*b*. First ends of the frames 4*a* and 4*b* are fixed to the rotation shaft 9, and the frames 4*a* and 4*b* extend in a direction perpendicular to the rotation shaft 9. The frames 4*a* and 4*b* are parallel to each other. Second ends of the frames 4*a* and 4*b* are connected to each other through a connection shaft 4*c*. When the rotation member 4 is located in the holding position A1, the frames 4*a* and 4*b* respectively face the guide members 5 and 6.

The rotation shaft 9 is connected to a motor M2 through a timing belt that is disposed outward from the side plate 3*b*. When the motor M2 rotates the rotation shaft 9 clockwise as seen from the left side, the rotation member 4 is rotated so as to be separated from the guide members 5 and 6, and the rotation member 4 moves from the holding position A1 to the withdrawn position A2. When the motor M2 rotates the rotation shaft 9 counterclockwise as seen from the left side, the rotation member 4 is rotated so as to approach the guide members 5 and 6 from above, and the rotation member 4 moves from the withdrawn position A2 to the holding position A1.

A sensor 25 for detecting the state of rotation of the rotation shaft 9 is disposed outward from the side plate 3*c*. The sensor 25 includes a rotary plate 26 and photosensors 27 and 28. The rotary plate 26 is fixed to an end portion of the rotation shaft 9. The photosensors 27 and 28 are fixed to the side plate 3*c*. Each of the photosensors 27 and 28 includes a light emitter and a light receiver. Each of the photosensors 27 and 28 detects whether the rotary plate 26 is located between the light emitter and the light receiver depending on whether a light beam from the light emitter reaches the light receiver. The rotary plate 26 and the photosensors 27 and 28 are positioned so that the rotary plate 26 blocks passage of light beams in both of the photosensors 27 and 28 when the rotation member 4 has moved from the holding position A1 to the withdrawn position A2 and so that the rotary plate 26 does not block passage of light beams in both of the photosensors 27 and 28 when the rotation member 4 has moved from the withdrawn position A2 to the holding position A1.

A pinch roller 10B is disposed in the rotation member 4 at a position corresponding to that of the drive roller 7B. The pinch roller 10B is rotatable around an axis L3 that is substantially parallel to an axis L1 of the rotation shaft 8B of the drive roller 7B and to an axis L2 of the rotation shaft 9 of the rotation member 4. The pinch roller 10B is fixed to the frame 4*a* through a plate spring 23 using a screw. Because the drive roller 7B is disposed nearer to the guide member 5 than to the guide member 6, the pinch roller 10B is disposed nearer to the frame 4*a* than to the frame 4*b*. Thus, a sufficient space for installing a prism 11, which will be described below, is provided on the frame 4*b* side.

When the rotation member 4 is located in the holding position A1, the plate spring 23 urges the pinch roller 10B toward the drive roller 7B. Therefore, the pinch roller 10A presses the card C1, which is disposed on the drive roller 7B, against the drive roller 7A. When the rotation shaft 8B rotates the drive roller 7B in this state, the card C1 is moved along the guide members 5 and 6 as the drive roller 7B rotates, and the pinch roller 10B is rotated due to the movement of the card C1. Thus, the pinch roller 10B and the drive roller 7B cooperate to transport the card C1 along the guide members 5 and 6. Thus, when printing an image, the position of the card C1 on the guide members 5 and 6 is adjusted, and when the image has been printed, the card C1 is transported forward from the guide members 5 and 6.

The prism 11 is disposed between the frame 4*a* and the frame 4*b* and is fixed to the frame 4*b*. The prism 11 includes a first right-angle prism 12 (first prism portion) and a second right-angle prism 13 (second prism portion), which are arranged side by side along the front-back direction, that is, along a transport direction L4 in which the pinch roller 10B transports the card C1. The first right-angle prism 12 is disposed on the back side of the second right-angle prism 13. The first right-angle prism 12 has perpendicular surfaces 12*b* and 12*c*, which extend perpendicular to each other; an inclined surface 12*a*, which diagonally intersects the perpendicular surfaces 12*b* and 12*c*; and a pair of side surfaces 12*d*. The right-angle prism 12 is disposed so that, when the rotation member 4 is in the holding position A1, the perpendicular surface 12*b* extends horizontally and faces upward, the perpendicular surface 12*c* faces forward, and the inclined surface 12*a* faces downward and backward. The second right-angle prism 13 is disposed on the front side of the first right-angle prism 12. The second right-angle prism 13 has perpendicular surfaces 13*b* and 13*c*, which extend perpendicular to each other; an inclined surface 13*a*, which diagonally intersects the perpendicular surfaces 13*b* and 13*c*; and a pair of side surfaces 13*d*. The right-angle prism 13 is disposed so that, when the rotation member 4 is in the holding position A1, the perpendicular surface 13*b* extends horizontally and faces upward, the perpendicular surface 13*c* faces backward, and the inclined surface 13*a* faces downward and forward. The right-angle prisms 12 and 13 are disposed so that the perpendicular surfaces 12*c* and 13*c* are in close contact with each other.

A method of printing an image by using the laser marker 1, which has the structure described above, will be described. First, the card C1 is inserted into the card slot 30 in a state in which the lenticular portion P1 faces upward and the long sides of the card C1 extend in the front-back direction. Then, the drive roller 7A and the pinch roller 10A cooperate to transport the card C1 to a position on the guide members 5 and 6. At this time, the rotation member 4 is located in the holding position A1. Next, as illustrated in FIG. 4, the drive roller 7B and the pinch roller 10B cooperate to transport the card C1 so that the lenticular portion P1 of the card C1 is located under the first right-angle prism 12. Then, the laser irradiation device 1B emits a laser beam B from the head 1*a* toward the first right-angle prism 12. The laser beam B enters the first right-angle prism 12, is refracted forward by the inclined surface 12*a*, which faces downward and backward, and reaches the lenticular portion P1.

Figure 5:
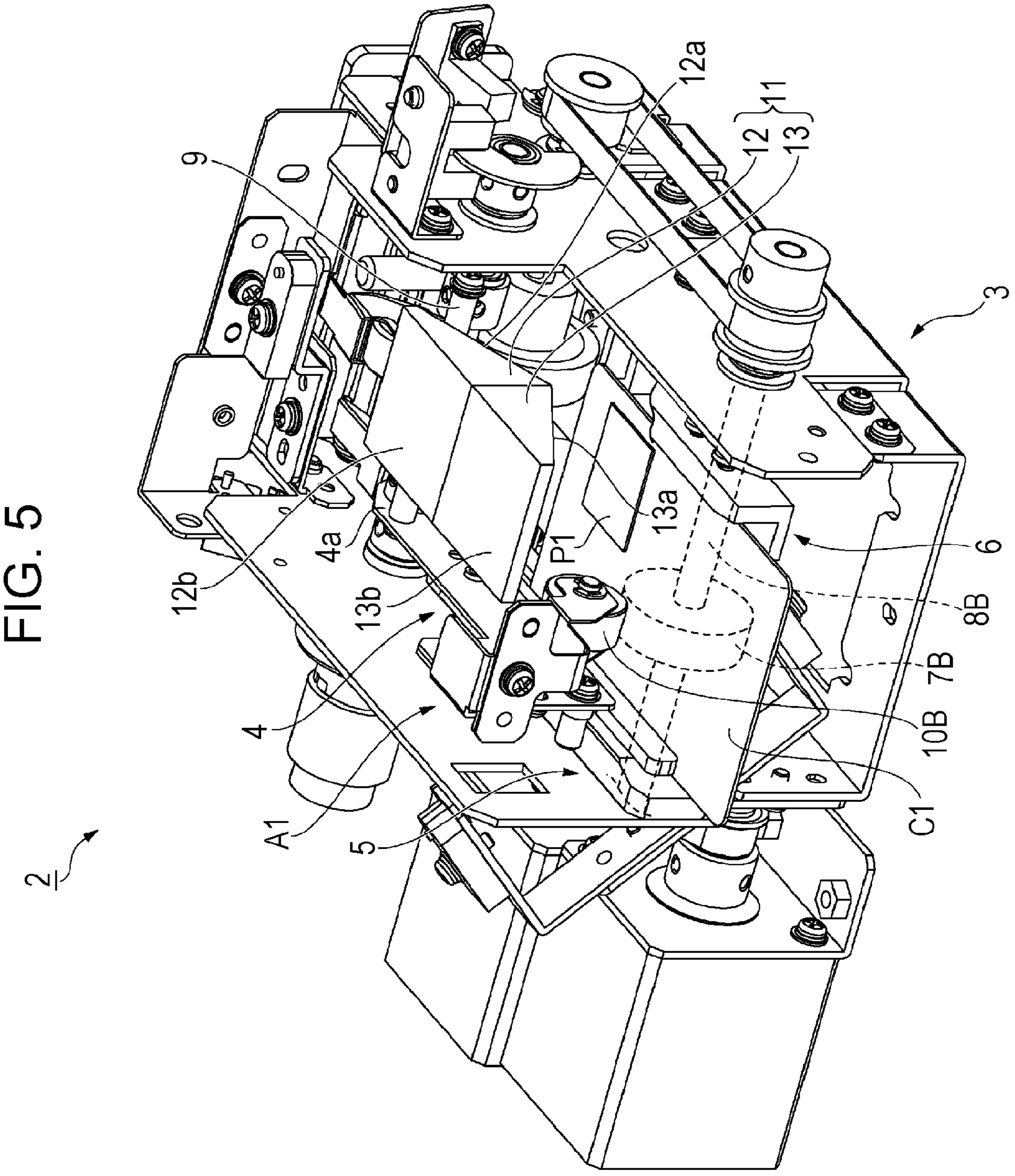
FIG. 5 is a perspective view illustrating a state in which the lenticular portion in FIG. 4 has been moved to the position of a second prism portion.
Figure 6:
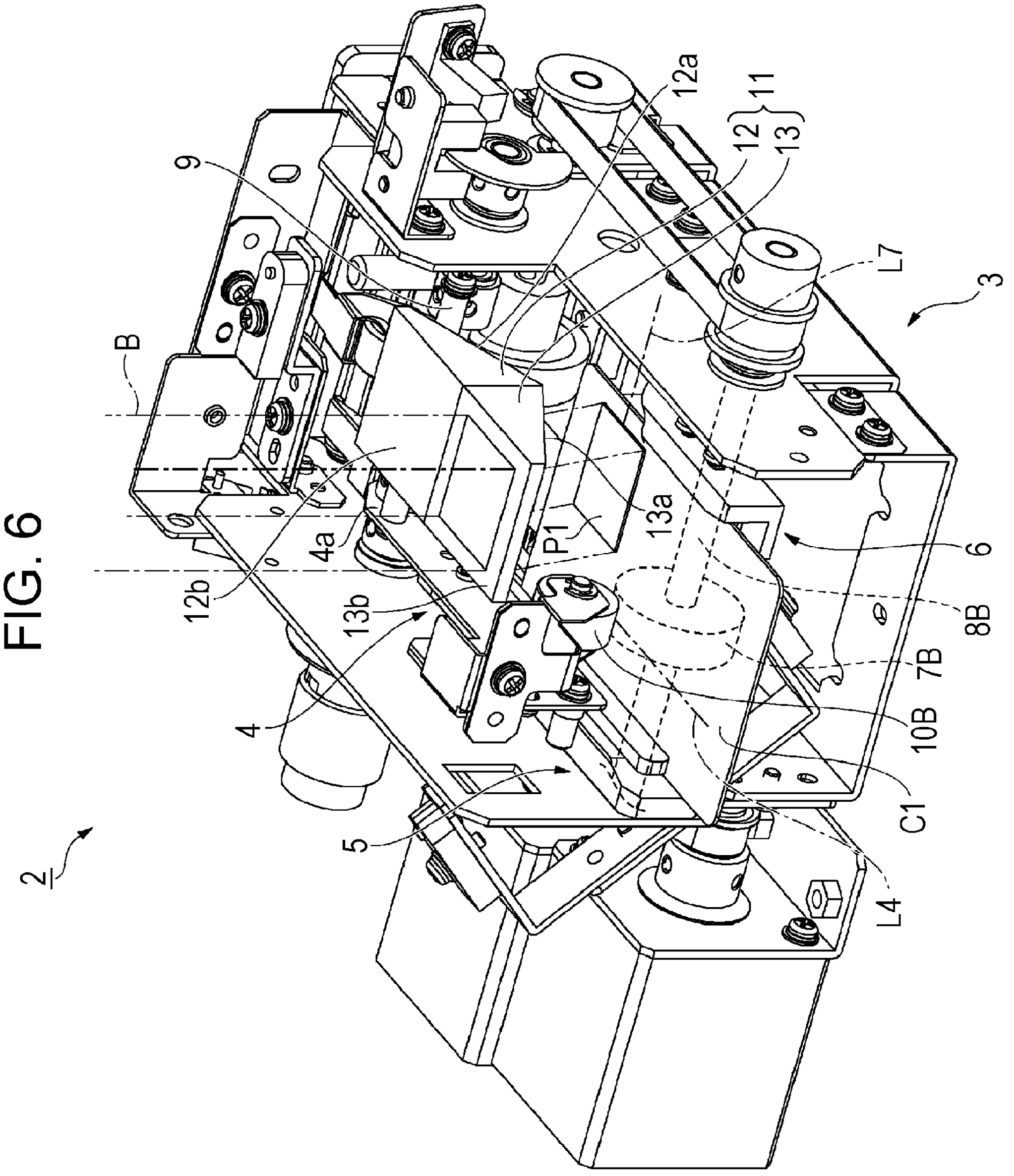
FIG. 6 is a perspective view illustrating a state in which a lenticular image is being printed in the lenticular portion by using the second prism portion in FIG. 5.

Next, as illustrated in FIG. 5, the drive roller 7B and the pinch roller 10B cooperate to transport the card C1 so that the lenticular portion P1 is located under the second right-angle prism 13. Then, as illustrated in FIG. 6, the laser irradiation device 1B emits a laser beam B from the head 1*a* toward the second right-angle prism 13. The laser beam B enters the second right-angle prism 13, is refracted backward by the inclined surface 13*a*, which faces downward and forward, and reaches the lenticular portion P1. Thus, the lenticular portion P1 is irradiated with the laser beams B that have been refracted in two directions, that is, forward and backward. Therefore, a lenticular image whose appearance changes as the card C1 is tilted around an axis L7 that is perpendicular to the transport direction L4 is printed.

Next, the drive roller 7B and the pinch roller 10B cooperate to transport the card C1 so that the position of the card C1 is adjusted to a position for printing an ordinary image. Then, the rotation member 4 is withdrawn to the withdrawn position A2 by rotating the rotation shaft 9, and the laser irradiation device 1B directly irradiates the upper surface of the card C1 with a laser beam emitted from the head 1*a*. The laser beam is vertically incident on the upper surface of the card C1 and an ordinary image is printed.

In the state in which the rotation member 4 is in the withdrawn position A2, the lenticular portion P1 may be directly irradiated with a laser beam. By doing so, the lenticular portion P1 is irradiated with laser beams from three directions, and therefore a lenticular image whose appearance changes to a larger degree as the card C1 is tilted can be printed.

With the laser marker 1 described above, when the rotation member 4 is in the holding position A1, a lenticular image can be printed by irradiating the card C1 with a laser beam at an angle by refracting the laser beam with the prism 11, which is fixed to the rotation member 4. When the rotation member 4 is in the withdrawn position A2, an ordinary image can be printed by irradiating the card C1 with a laser beam that has not passed through the prism 11. Because a lenticular image and an ordinary image can be printed without tilting the card C1, it is not necessary to provide a mechanism for tilting the card C1. Therefore, the laser marker 1 can be reduced in size. In particular, the rotation member 4, which moves the prism 11 between a position in the optical path of the laser beam and a position outside of the optical path of the laser beam, rotates between the holding position A1 and the withdrawn position A2. Therefore, a mechanism for moving the rotation member 4 can be made simpler easily, and the laser marker 1 can be further reduced in size. Moreover, when the rotation member 4 is moved so as to withdraw the prism 11 to a position outside of the optical path of a laser beam, the pinch roller 10B is also withdrawn to a position outside of the optical path of a laser beam. Therefore, an ordinary image can be printed without being hindered by the pinch roller 10B. Because only one rotation member 4 is used to withdraw the pinch roller 10B and to withdraw the prism 11, the laser marker 1 can be further reduced in size.

The prism 11 includes the right-angle prisms 12 and 13 for refracting laser beams in different directions. The right-angle prisms 12 and 13 are arranged side by side along the transport direction L4, in which the pinch roller 10B transports the card C1. Thus, only by transporting the card C1 by using a simple mechanism having the drive roller 7B and the pinch roller 10B, the card C1 can be moved quickly to positions corresponding to those of the right-angle prisms 12 and 13. Therefore, the card C1 can be irradiated with laser beams that have passed through the right-angle prisms 12 and 13 and have been refracted in different directions, and therefore a lenticular image whose appearance changes to a large degree can be printed quickly. Moreover, because the card C1 is transported by using a simple mechanism having the drive roller 7B and the pinch roller 10B, the laser marker 1 can be reduced in size.

The axis L1 of the drive roller 7B and the axis L3 of the pinch roller 10B are parallel to the axis L2 of the rotation shaft 9 of the rotation member 4. Therefore, even when the holding position A1 of the rotation member 4 becomes displaced in the up-and-down direction due to variation in the thickness of the card C1, the parallelism between the pinch roller 10B and the card C1 is maintained, and therefore the peripheral surface of the pinch roller 10B comes into close contact with the upper surface of the card C1. Moreover, the card C1 can be prevented from being displaced in a direction that intersects the transport direction L4 of the pinch roller 10B, when the rotation member 4 rotates and reaches the holding position A1 and the pinch roller 10B comes into contact with the card C1. Therefore, the card C1 can be transported with high accuracy in the transport direction L4, and the lenticular portion P1 of the card C1 and the prism 11 can be positioned relative to each other with high accuracy. Because the right-angle prisms 12 and 13 of the prism 11 are arranged side by side along the transport direction L4, by transporting the card C1 with high accuracy in the transport direction L4, the lenticular portion P1 of the card C1 and the right-angle prisms 12 and 13 can be positioned relative to each other with high accuracy.

Next, laser markers according to second and third embodiments according to the present invention will be described. Elements the same as or equivalent to those of the first embodiment will be denoted by the same numerals, and overlapping descriptions of such elements will be omitted.

Second Embodiment

As illustrated in FIGS. 7 to 11, a laser marker according to the second embodiment includes a transport device 2A, instead of the transport device 2 of the laser marker 1. The transport device 2A includes a prism 14, instead of the prism 11 of the transport device 2. The prism 14 is different from the prism 11. The laser marker prints a lenticular image whose appearance changes when a card C2 is tilted around an axis L8 that diagonally intersects the transport direction L4.

Figure 7:
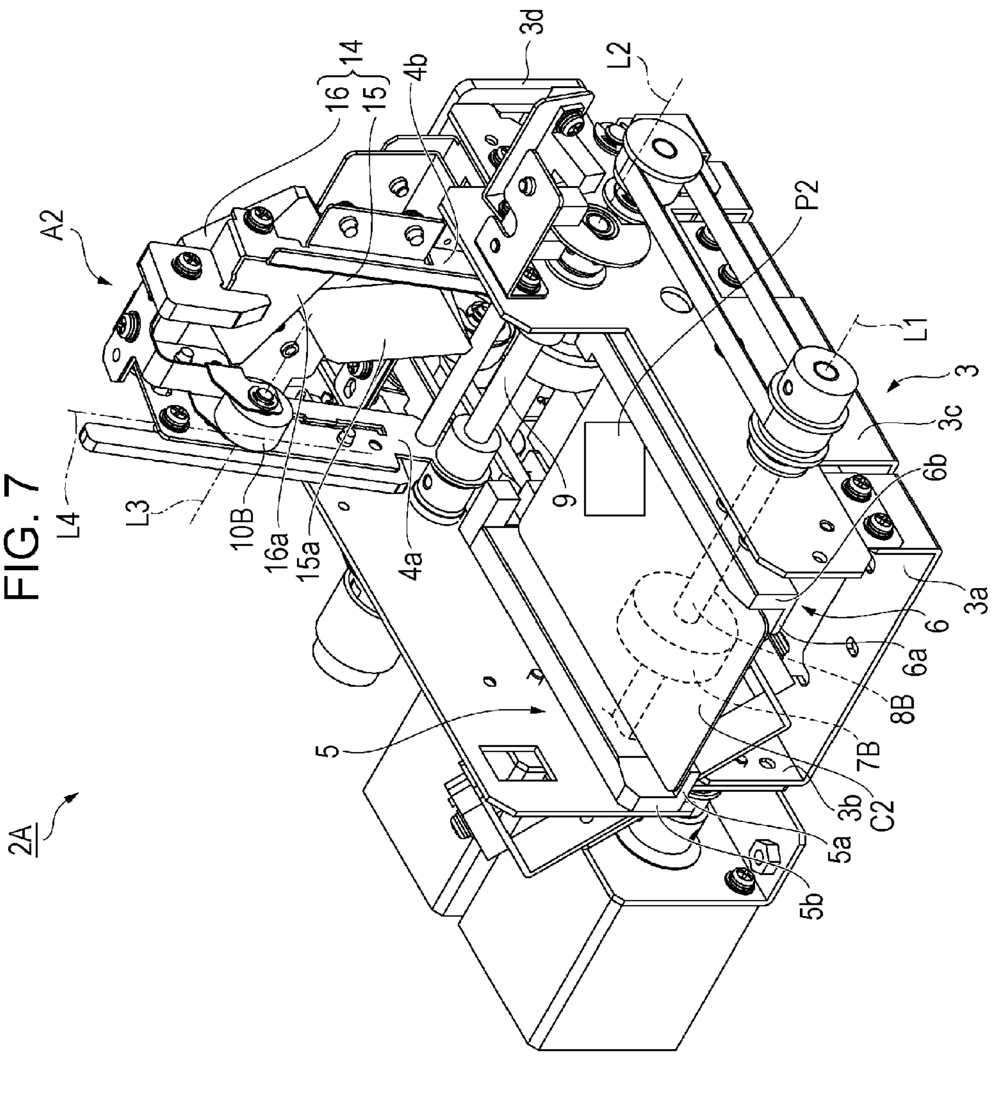
FIG. 7 is a perspective view illustrating a transport device of a laser marker according to a second embodiment of the present invention.
Figure 8:
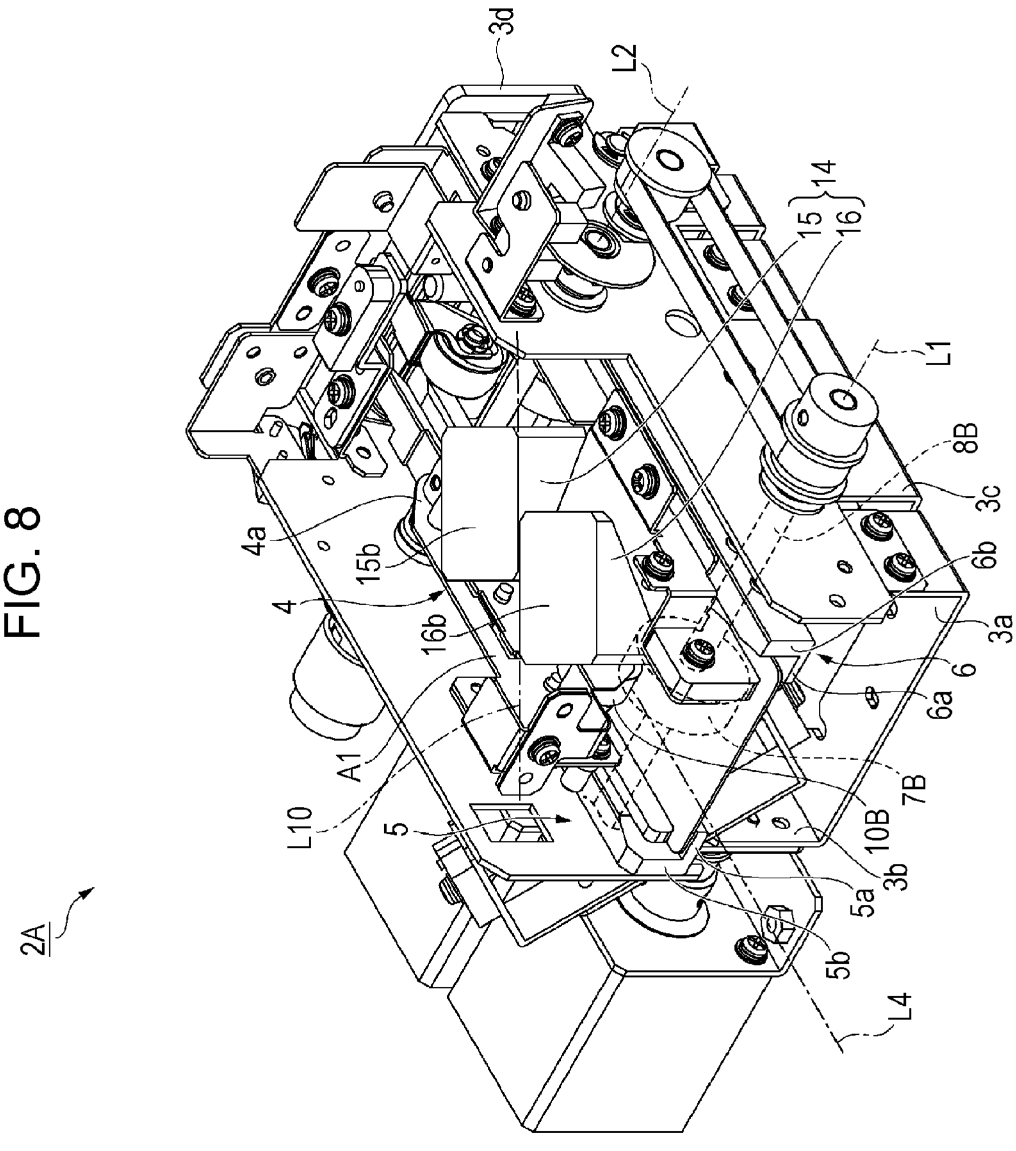
FIG. 8 is a perspective view illustrating a rotation member in FIG. 7 in a holding position.
Figure 9:
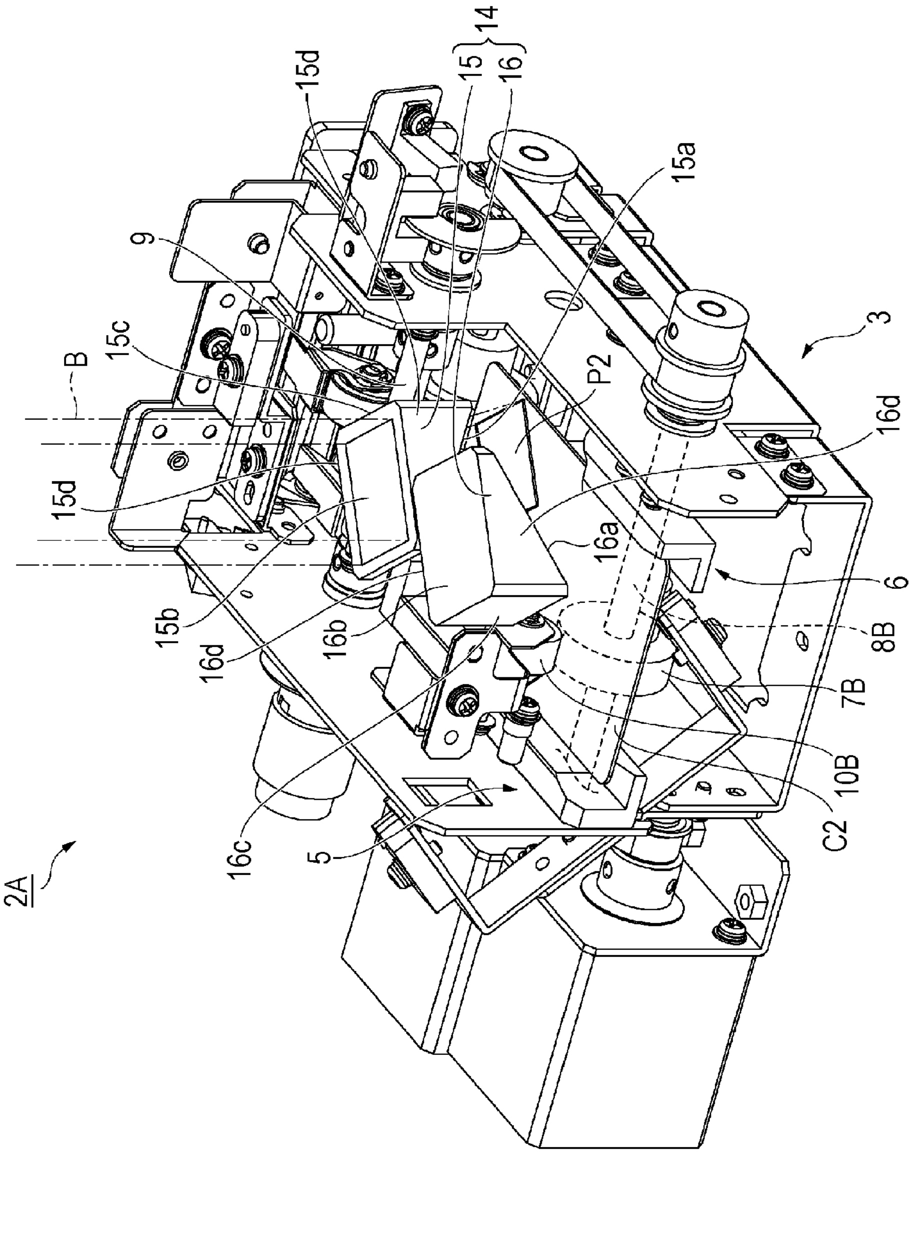
FIG. 9 is a perspective view illustrating a state in which a lenticular image is being printed in a lenticular portion by using a first prism portion in FIG. 8.

As illustrated in FIGS. 7 to 9, the prism 14 includes a first right-angle prism 15 (first prism portion) and a second right-angle prism 16 (second prism portion), which are arranged side by side along the transport direction L4, in which the pinch roller 10B transports the card C2. In plan view, the right-angle prisms 15 and 16 are disposed along the axis L10, which diagonally intersects the transport direction L4. To be specific, the first right-angle prism 15 is disposed on the back side of the second right angle prism 16. The first right-angle prism 15 has perpendicular surfaces 15*b* and 15*c*, which extend perpendicular to each other; an inclined surface 15*a*, which diagonally intersects the perpendicular surfaces 15*b* and 15*c*; and a pair of side surfaces 15*d*. The first right-angle prism 15 is disposed so that, when the rotation member 4 is in the holding position A1, the perpendicular surface 15*b* extends horizontally and faces upward, the side surfaces 15*d* extend along the axis L10, the perpendicular surface 15*c* faces obliquely backward to the left, and the inclined surface 15*a* faces downward and obliquely forward to the right. The second right-angle prism 16 is disposed on the front side of the first right-angle prism 15. The second right-angle prism 16 has perpendicular surfaces 16*b* and 16*c*, which extend perpendicular to each other; an inclined surface 16*a*, which diagonally intersects the perpendicular surfaces 16*b* and 16*c*; and a pair of side surfaces 16*d*. The second right-angle prism 16 is disposed so that, when the rotation member 4 is in the holding position A1, the perpendicular surface 16*b* extends horizontally and faces upward, the side surfaces 16*d* extend along the axis L10, the perpendicular surface 16*c* faces obliquely forward to the right, and the inclined surface 16*a* faces downward and obliquely backward to the left. The right-angle prisms 15 and 16 are disposed so that one of the side surfaces 15*d* and one of the side surfaces 16*d* are in close contact with each other and so that the right-angle prisms 15 and 16 are displaced from each other along the axis L10. The vertical perpendicular surface 16*c* of the right-angle prism 16 is located obliquely forward to the right of an intersection line of the horizontal perpendicular surface 15*b* and the inclined surface 15*a* of the right-angle prism 15. Thus, a lenticular portion P2 can be irradiated with a laser beam that has passed through each of the right-angle prisms 15 and 16 by only transporting the card C2 in the front-back direction.

A method of printing a lenticular image by using the laser marker, which includes the transport device 2A, will be described. First, the card C2 is inserted into the card slot 30 in a state in which the lenticular portion P2 faces upward and the long sides of the card C2 extend in the front-back direction. Then, the drive roller 7A and the pinch roller 10A cooperate to transport the card C2 to a position on the guide members 5 and 6. At this time, the rotation member 4 is located in the holding position A1. Next, as illustrated in FIG. 9, the drive roller 7B and the pinch roller 10B cooperate to transport the card C2 so that the lenticular portion P2 of the card C2 is located under the first right-angle prism 15. Then, the laser irradiation device 1B emits a laser beam B from the head 1*a* toward the first right-angle prism 15. The laser beam B enters the first right-angle prism 15, is refracted obliquely backward to the left by the inclined surface 15*a*, which faces downward and obliquely forward to the right, and reaches the lenticular portion P2.

Figure 10:
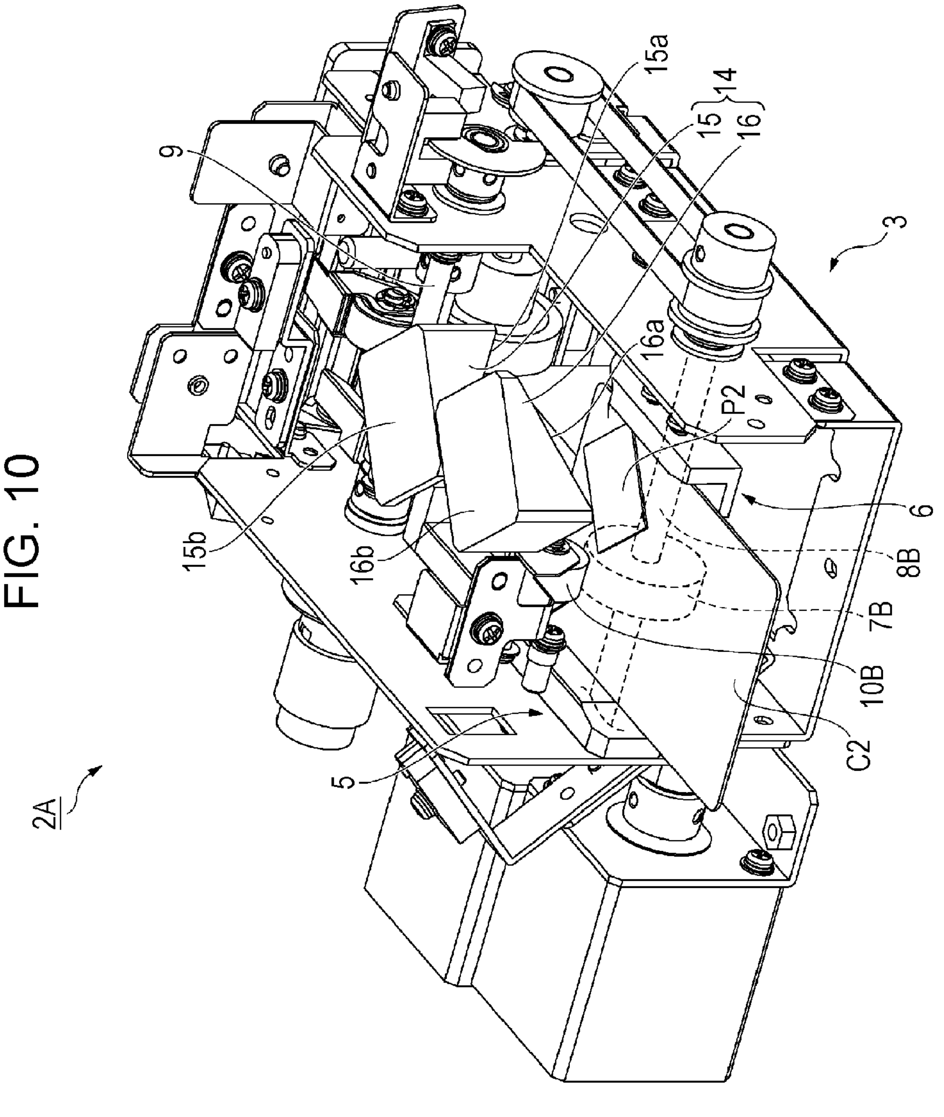
FIG. 10 is a perspective view illustrating a state in which the lenticular portion in FIG. 9 has been moved to the position of a second prism portion.
Figure 11:
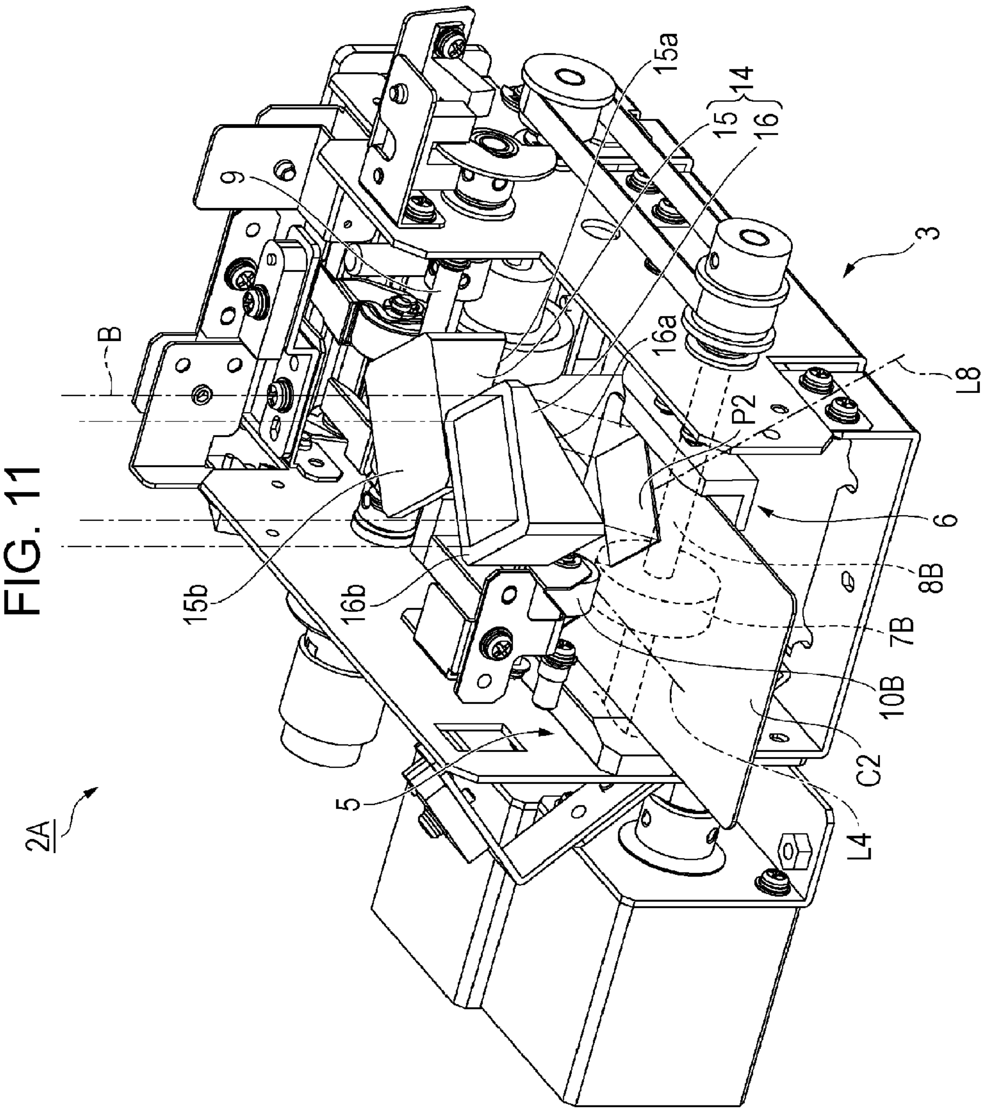
FIG. 11 is a perspective view illustrating a state in which a lenticular image is being printed in the lenticular portion by using the second prism portion in FIG. 10.
Figure 12:
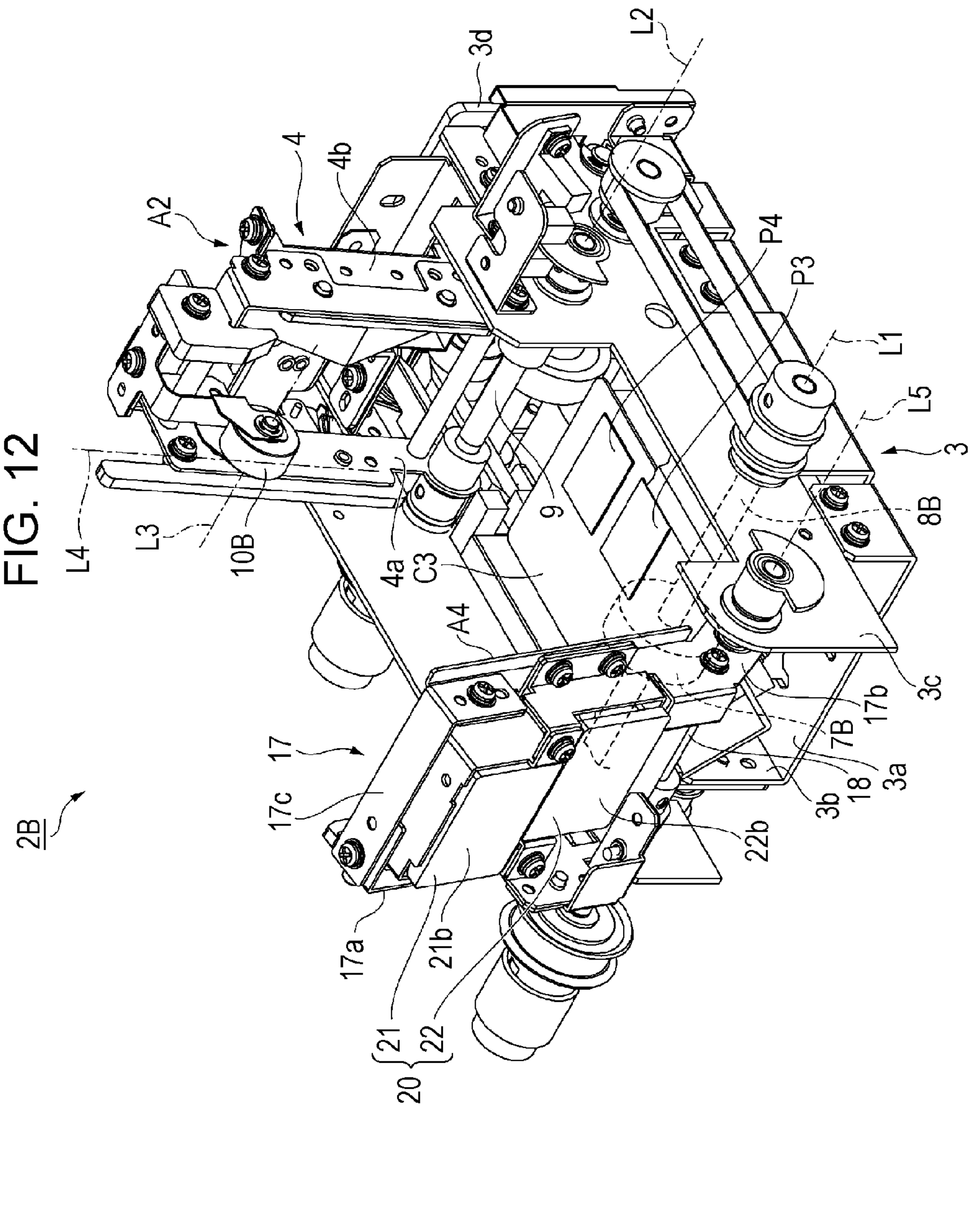
FIG. 12 is a perspective view illustrating a transport device of a laser marker according to a third embodiment of the present invention.
Figure 13:
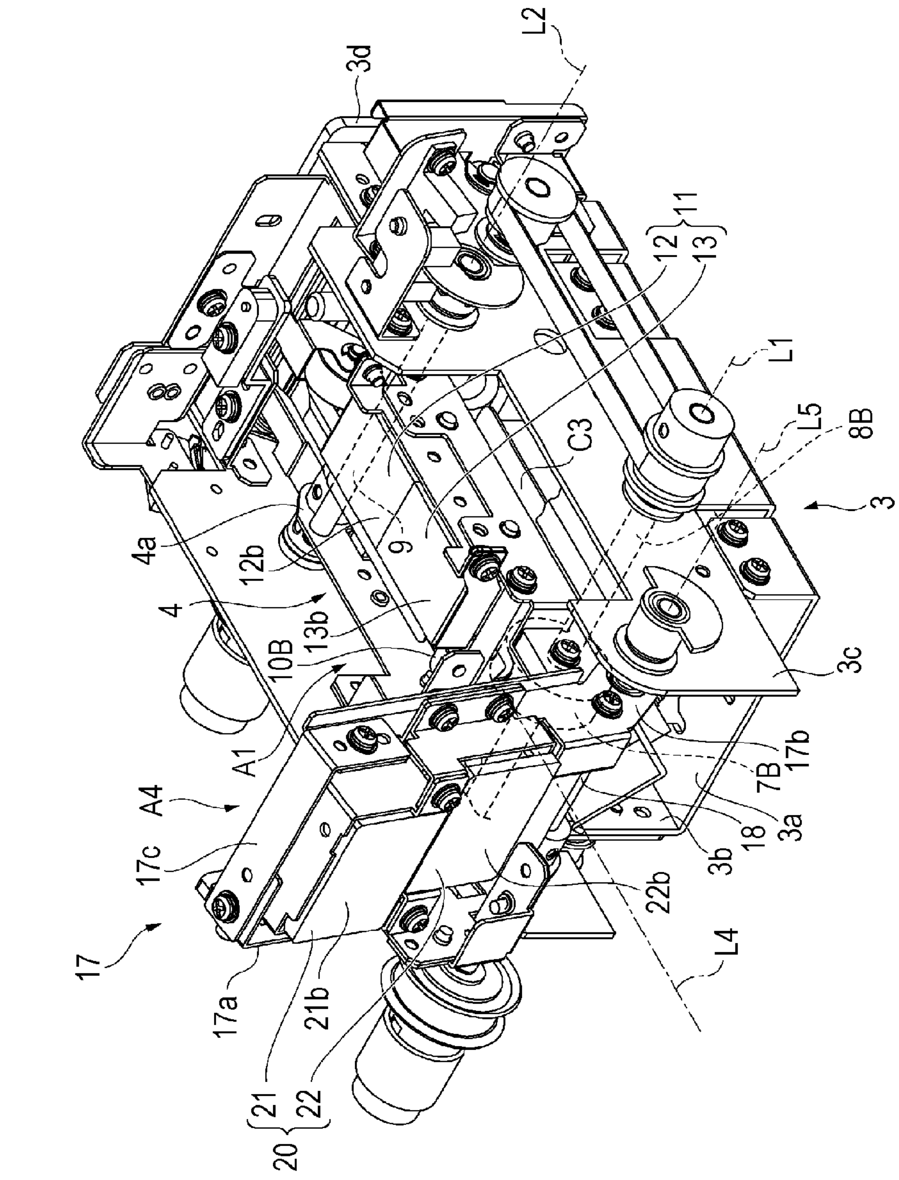
FIG. 13 is a perspective view illustrating a first rotation member in FIG. 12 in a holding position.
Figure 14:
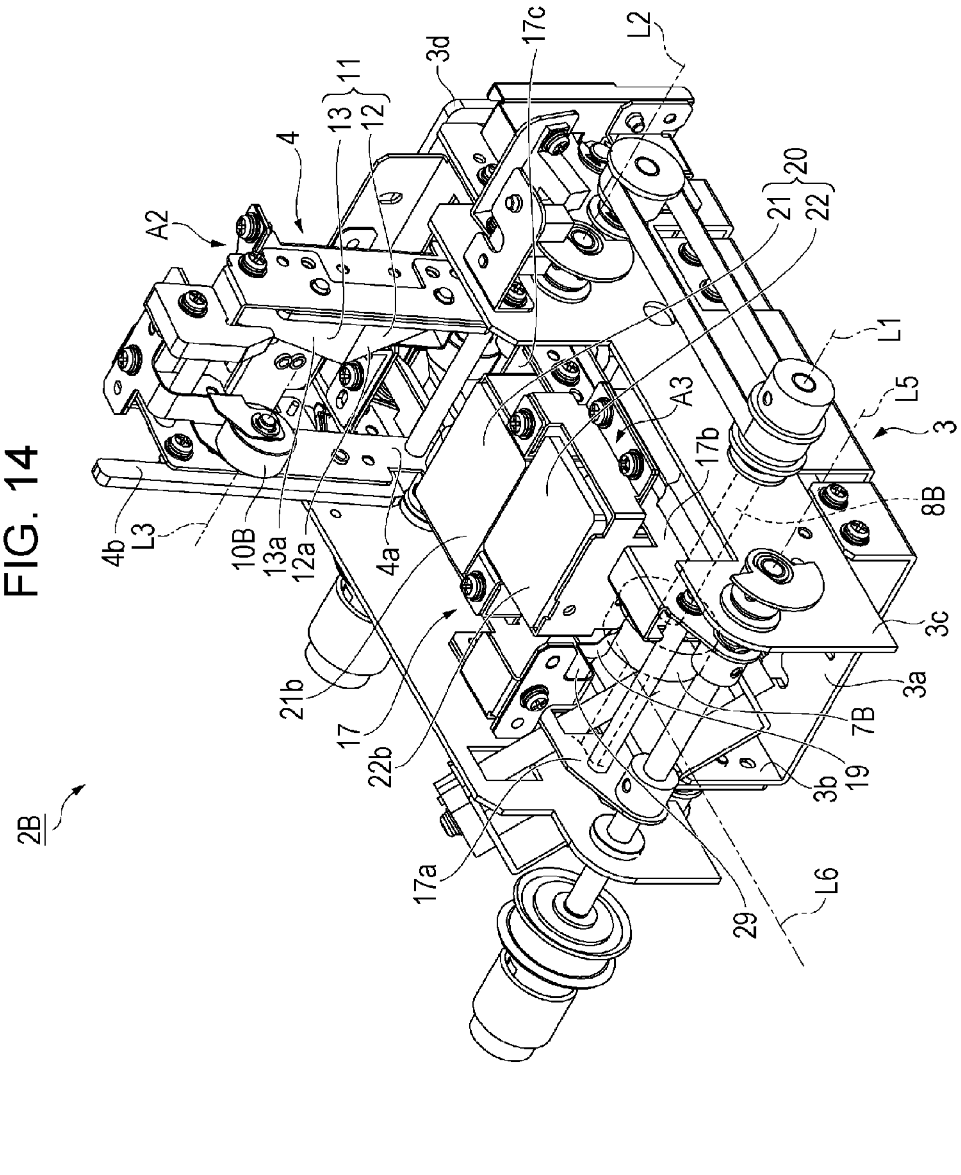
FIG. 14 is a perspective view illustrating a second rotation member in FIG. 12 in a holding position.

Next, as illustrated in FIG. 10, the drive roller 7B and the pinch roller 10B cooperate to transport the card C2 so that the lenticular portion P2 is located under the second right-angle prism 16. Then, as illustrated in FIG. 11, the laser irradiation device 1B emits a laser beam B from the head 1*a* toward the second right-angle prism 16. The laser beam B enters the second right-angle prism 16, is refracted obliquely forward to the right by the inclined surface 16*a*, which faces downward and obliquely backward to the left, and reaches the lenticular portion P2. Thus, the lenticular portion P2 is irradiated with the laser beams B that are inclined in two directions, that is, obliquely backward to the left and obliquely forward to the right. Therefore, a lenticular image whose appearance changes as the card C2 is tilted around the axis L8, which diagonally intersects the transport direction L4, is printed.

As shown in the second embodiment, by changing a prism that is fixed to the rotation member 4, the direction in which a laser beam with which the lenticular portion is irradiated is refracted can be freely set. Thus, a direction in which a card is tilted so as to change the appearance of an image in the lenticular portion can be freely set.

Third Embodiment

As illustrated in FIGS. 12 to 17, a laser marker according to the third embodiment includes a transport device 2B, instead of the transport device 2 of the laser marker 1. The transport device 2B includes a second rotation member 17 in addition to the first rotation member 4, which is the same as the rotation member 4 of the transport device 2. The laser marker prints, in addition to a lenticular image whose appearance changes as the card C3 is tilted around the axis L7, which is perpendicular to the transport direction L4, a lenticular image whose appearance changes as the card C3 is tilted around an axis L9 that is parallel to a transport direction L6. The rotation member 17 rotates between a holding position A3 and a withdrawn position A4. In the holding position A3, the rotation member 4 holds the card C3 in cooperation with the base unit 3. In the withdrawn position A4, the rotation member 4 is located outside of the optical path of a laser beam. The rotation member 17 is disposed so that the holding position A3 overlaps the holding position A1 of the rotation member 4.

As illustrated in FIGS. 12 to 15, in the transport device 2B, a rotation shaft 18 is disposed in front of the guide members 5 and 6 so as to extend parallel to the rotation shaft 9. The rotation shaft 18 extends through shaft bearing holes that are attached to the side plates 3*b* and 3*c*. The rotation member 17 is fixed to the rotation shaft 18. The rotation member 17 includes a pair of frames 17*a* and 17*b*. First ends of the frames 17*a* and 17*b* are fixed to the rotation shaft 18, and the frames 17*a* and 17*b* extend in a direction perpendicular to the rotation shaft 18. The frames 17*a* and 17*b* are parallel to each other. Second ends of the frames 17*a* and 17*b* are connected to each other through a frame 17*c*. When the rotation member 17 is located in the holding position A3, the frames 17*a* and 17*b* respectively face the guide members 5 and 6.

The rotation member 17 is connected to a motor (not shown) through a timing belt that is disposed outward from the side plate 3*b*. A sensor (not shown) for detecting the state of rotation of the rotation shaft 18 is disposed outward from the side plate 3*c*.

When the motor rotates the rotation shaft 18 counterclockwise as seen from the left side, the rotation member 17 is rotated so as to be separated from the guide members 5 and 6, and the rotation member 17 moves from the holding position A3 to the withdrawn position A4. When the motor rotates the rotation shaft 18 clockwise as seen from the left side, the rotation member 17 is rotated so as to approach the guide members 5 and 6 from above, and the rotation member 17 moves from the withdrawn position A4 to the holding position A3. In contrast, as described above, the rotation member 4 moves from the holding position A1 to the withdrawn position A2 when the rotation shaft 9 is rotated clockwise as seen from the left side, and moves from the withdrawn position A2 to the holding position A1 when the rotation shaft 9 is rotated counterclockwise as seen from the left side. That is, the rotation member 4 and the rotation member 17 rotate in opposite directions.

A pinch roller 19 is disposed in the rotation member 17 at a position corresponding to that of the drive roller 7B. The pinch roller 19 is rotatable around an axis that is substantially parallel to an axis L1 of the rotation shaft 8B of the drive roller 7B and to an axis L5 of the rotation shaft 18 of the rotation member 17. The pinch roller 19 is fixed to the frame 17*a* through a plate spring 29 using a screw. Because the drive roller 7B is disposed nearer to the guide member 5 than to the guide member 6, the pinch roller 19 is disposed nearer to the frame 17*a* than to the frame 17*b*. Thus, a sufficient space for installing a prism 20, which will be described below, is provided on the frame 17*b* side.

The prism 20 is disposed between the frame 17*a* and the frame 17*b* and is fixed to the frame 17*b*. The prism 20 includes a third right-angle prism 21 and a fourth right-angle prism 22, which are arranged side by side along the front-back direction, that is, along the transport direction L6, in which the pinch roller 19 transports the card C3. The third right-angle prism 21 is disposed on the back side of the fourth right-angle prism 22. The third right-angle prism 21 has perpendicular surfaces 21*b* and 21*c*, which extend perpendicular to each other; an inclined surface 21*a*, which diagonally intersects the perpendicular surfaces 21*b* and 21*c*; and a pair of side surfaces 21*d*. The third right-angle prism 21 is disposed so that, when the rotation member 17 is in the holding position A3, the perpendicular surface 21*b* extends horizontally and faces upward, the perpendicular surface 21*c* faces leftward, and the inclined surface 21*a* faces downward and rightward. The fourth right-angle prism 22 is disposed on the front side of the third right-angle prism 21. The fourth right-angle prism 22 has perpendicular surfaces 22*b* and 22*c*, which extend perpendicular to each other; an inclined surface 22*a*, which diagonally intersects the perpendicular surfaces 22*b* and 22*c*; and a pair of side surfaces 22*d*. The fourth right-angle prism 22 is disposed so that, when the rotation member 17 is in the holding position A3, the perpendicular surface 22*b* extends horizontally and faces upward, the perpendicular surface 22*c* faces rightward, and the inclined surface 22*a* faces downward and leftward. The right-angle prisms 21 and 22 are disposed so that one of the side surfaces 21*d* and one of the side surfaces 22*d* are in close contact with each other and so that the right-angle prisms 21 and 22 are displaced from each other along the side surfaces 21*d* and 22*d*. The vertical perpendicular surfaces 22*c* of the right-angle prism 22 are located leftward from an intersection line of the horizontal perpendicular surface 21*b* and the inclined surface 21*a* of the right-angle prism 21. Thus, a lenticular portion P4 can be irradiated with a laser beam that has passed through each of the right-angle prisms 21 and 22 by only transporting the card C3 in the front-back direction.

A method of printing lenticular images by using a laser marker including the transport device 2B will be described. In the example described here, lenticular images are formed on the card C3, which has a first lenticular portion P3 and a second lenticular portion P4. First, the card C3 is inserted into the card slot 30 in a state in which the lenticular portions P3 and P4 face upward and the long sides of the card C3 extend in the front-back direction. Then, the drive roller 7A and the pinch roller 10A cooperate to transport the card C3 to a position on the guide members 5 and 6. At this time, the rotation member 4 is located in the holding position A1, and the rotation member 17 is located in the withdrawn position A4. Next, through the same process as described in the first embodiment, a lenticular image is formed in the first lenticular portion P3.

Figure 15:
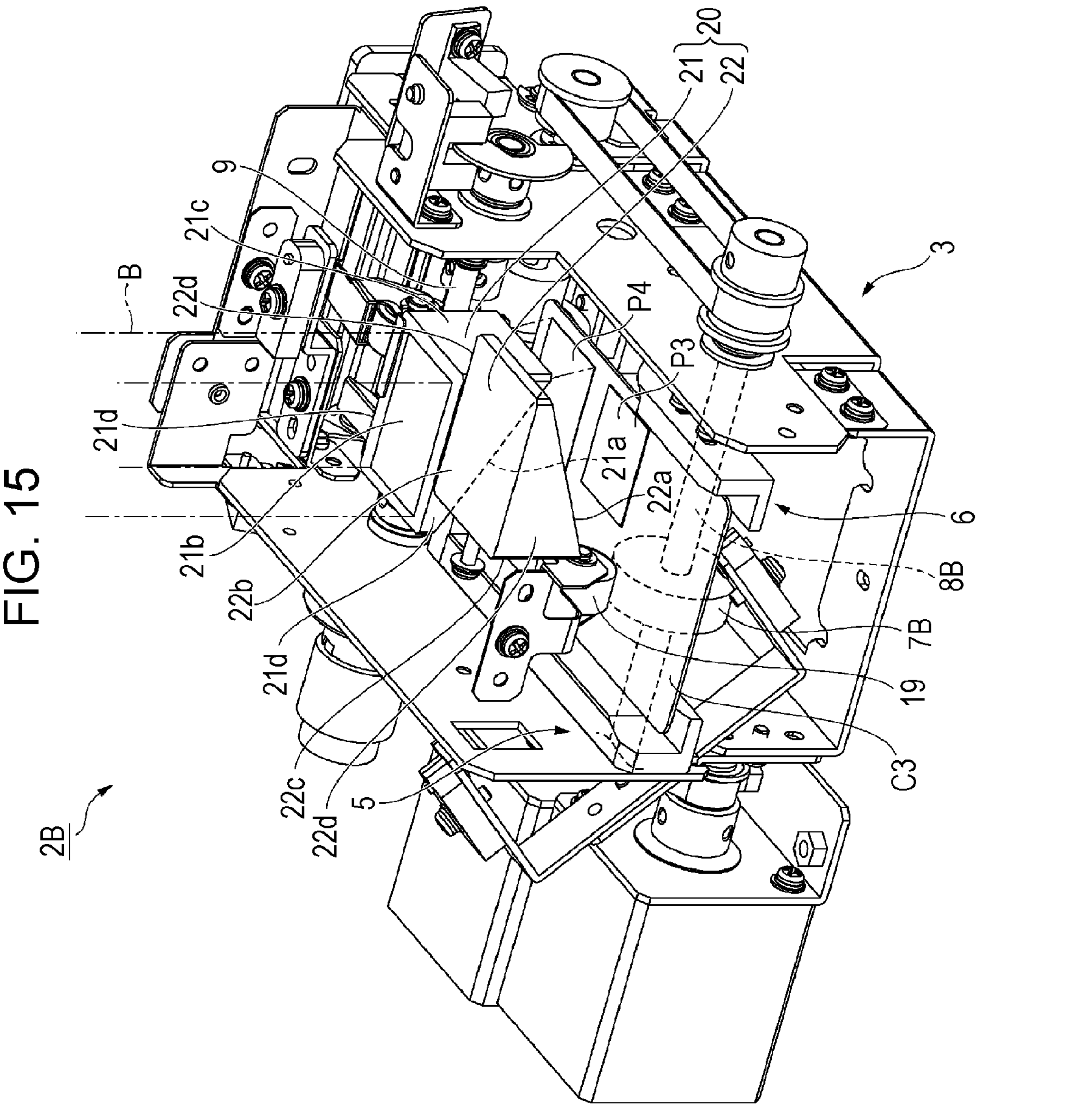
FIG. 15 is a perspective view illustrating a state in which a lenticular image is being printed on a second lenticular portion by using a third prism portion in FIG. 14.

Next, the rotation member 4 is rotated to the withdrawn position A2, and the rotation member 17 is rotated to the holding position A3. Then, as illustrated in FIG. 15, the drive roller 7B and the pinch roller 19 cooperate to transport the card C3 so that the lenticular portion P4 of the card C3 is located under the third right-angle prism 21. Subsequently, the laser irradiation device 1B emits a laser beam B from the head 1*a* toward the third right-angle prism 21. The laser beam B enters the third right-angle prism 21, is refracted leftward by the inclined surface 21*a*, which faces downward and rightward, and reaches the lenticular portion P4.

Figure 16:
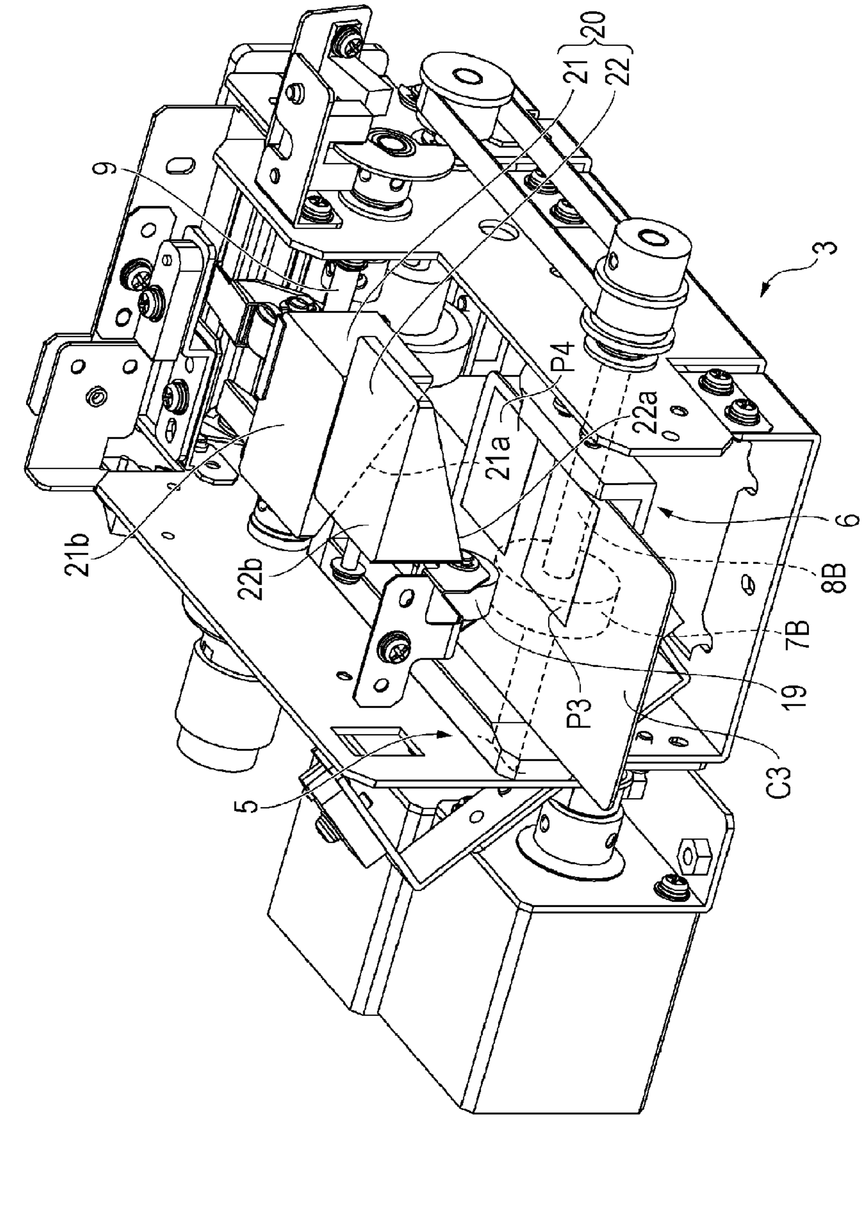
FIG. 16 is a perspective view illustrating a state in which the second lenticular portion in FIG. 15 has been moved to the position of a fourth prism portion.
Figure 17:
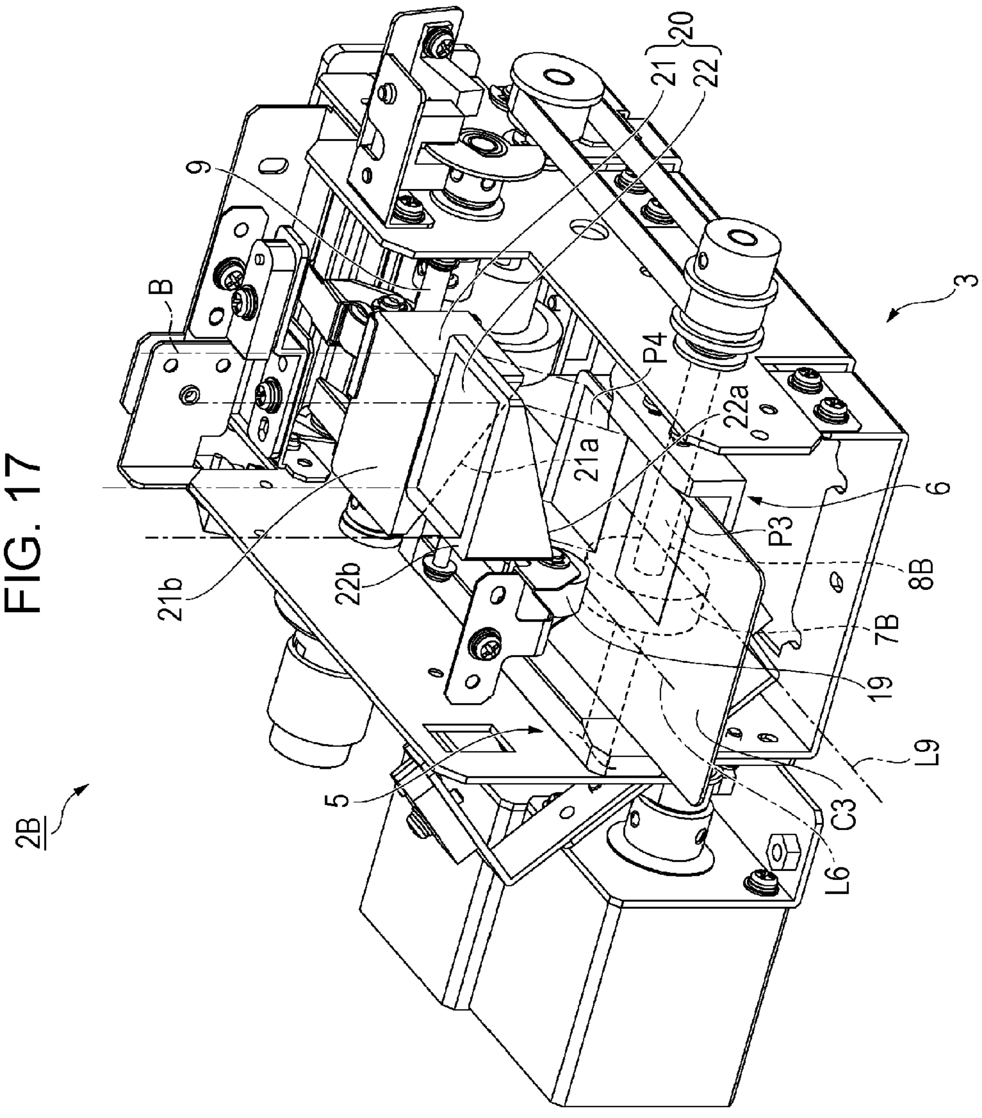
FIG. 17 is a perspective view illustrating a state in which a lenticular image is being printed on the second lenticular portion by using the fourth prism portion in FIG. 16.

Next, as illustrated in FIG. 17, the drive roller 7B and the pinch roller 19 cooperate to transport the card C3 so that the second lenticular portion P4 is located under the fourth right-angle prism 22. Then, as illustrated in FIG. 16, the laser irradiation device 1B emits a laser beam B from the head 1*a* toward the fourth right-angle prism 22. The laser beam B enters the fourth right-angle prism 22, is refracted rightward by the inclined surface 22*a*, which faces downward and leftward, and reaches the lenticular portion P4. Thus, the lenticular portion P4 is irradiated with the laser beams B that have been refracted in two directions, that is, rightward and leftward. Therefore, a lenticular image whose appearance changes as the card C3 is tilted around an axis L9, which is parallel to the transport direction L6, is printed.

As described above, with the laser marker according to the third embodiment, as with the laser marker 1 according to the first embodiment, a lenticular image whose appearance changes as the card C3 is tilted along the axis L7, which is perpendicular to the transport direction L4, can be printed. Moreover, by changing a rotation member that is located in an overlapping portion in which the holding position A1 and the holding position A3 overlap each other from the rotation member 4 to the rotation member 17, a prism that is located in the optical path of the laser beam is changed from the prism 11 to the prism 20; and thereby a lenticular image whose appearance changes as the card C3 is tilted around the axis L9, which extends parallel to the transport direction L6, can be printed. Thus, by changing a rotation member that is located in the overlapping portion in which the holding positions A1 and A3 overlap each other between the rotation members 4 and 17, the prisms 11 and 20 can be located in the optical path of a laser beam in turn; and thereby a lenticular image whose appearance changes to a large degree can be printed. Moreover, because the same overlapping portion, in which the holding positions A1 and A3 overlap each other, is used to print an image when each of the prisms 11 and 20 is located in the optical path of the laser beam, the laser marker can be reduced in size.

The rotation member 4 includes the pinch roller 10B, and the rotation member 17 includes the pinch roller 19, which is similar to the pinch roller 10B. Therefore, when whichever of the rotation members 4 and 17 is at a corresponding one of the holding positions A1 and A3, the card C3 can be transported in the same direction (L4=L6).

The axis L2 of the rotation shaft 9 of the rotation member 4 and the axis L5 of the rotation shaft 18 of the rotation member 17 are parallel to each other and are respectively parallel to the axis of the pinch roller 10B and the axis of the pinch roller 19. Therefore, when whichever of the rotation members 4 and 17 is in the corresponding one of the holding positions A1 and A3, the parallelism between the pinch rollers 10B and 19 and the card C3 is maintained, and therefore the peripheral surfaces of the pinch rollers 10B and 19 come into close contact with the upper surface of the card C3. Moreover, when the rotation members 4 and 17 rotate and reach the holding positions A1 and A3 and the pinch rollers 10B and 19 come into contact with the card C3, the card C3 can be prevented from being displaced in directions that intersect the transport directions L4 and L6 of the pinch rollers 10B and 19. Therefore, the card C3 can be transported with high accuracy in the transport directions L4 and L6, and the lenticular portions P3 and P4 of the card C3 and the prisms 11 and 20 can be positioned relative to each other with high accuracy. Because the right-angle prisms 12 and 13 of the prism 11 are arranged side by side along the transport direction L4 and the right-angle prisms 21 and 22 of the prism 20 are arranged side by side along the transport direction L6, by transporting the card C3 with high accuracy along the transport directions L4 and L6, the lenticular portions P3 and P4 of the card C3 and the right-angle prisms 12, 13, 21, and 22 can be positioned relative to each other with high accuracy.

In the present embodiment, the rotation members 4 and 17 rotate in opposite directions when moving from the holding positions A1 and A3 to the withdrawn positions A2 and A4 and when moving from the withdrawn positions A2 and A4 to the holding positions A1 and A3. However, this is not necessarily the case, and the rotation members 4 and 17 may rotate in different directions that are not opposite directions. For example, the rotation shaft 18 of the rotation member 17 may extend parallel to the guide members 5 and 6, so that the rotation members 4 and 17 may rotate around axes that are perpendicular to each other.

In the present embodiment, an example in which lenticular images are formed in the lenticular portions P3 and P4 by using the prism 11 and the prism 20 has been described. Alternatively, lenticular images may be printed in the same lenticular portion by using the prism 11 and the prism 20.

Fourth Embodiment

Figure 18:
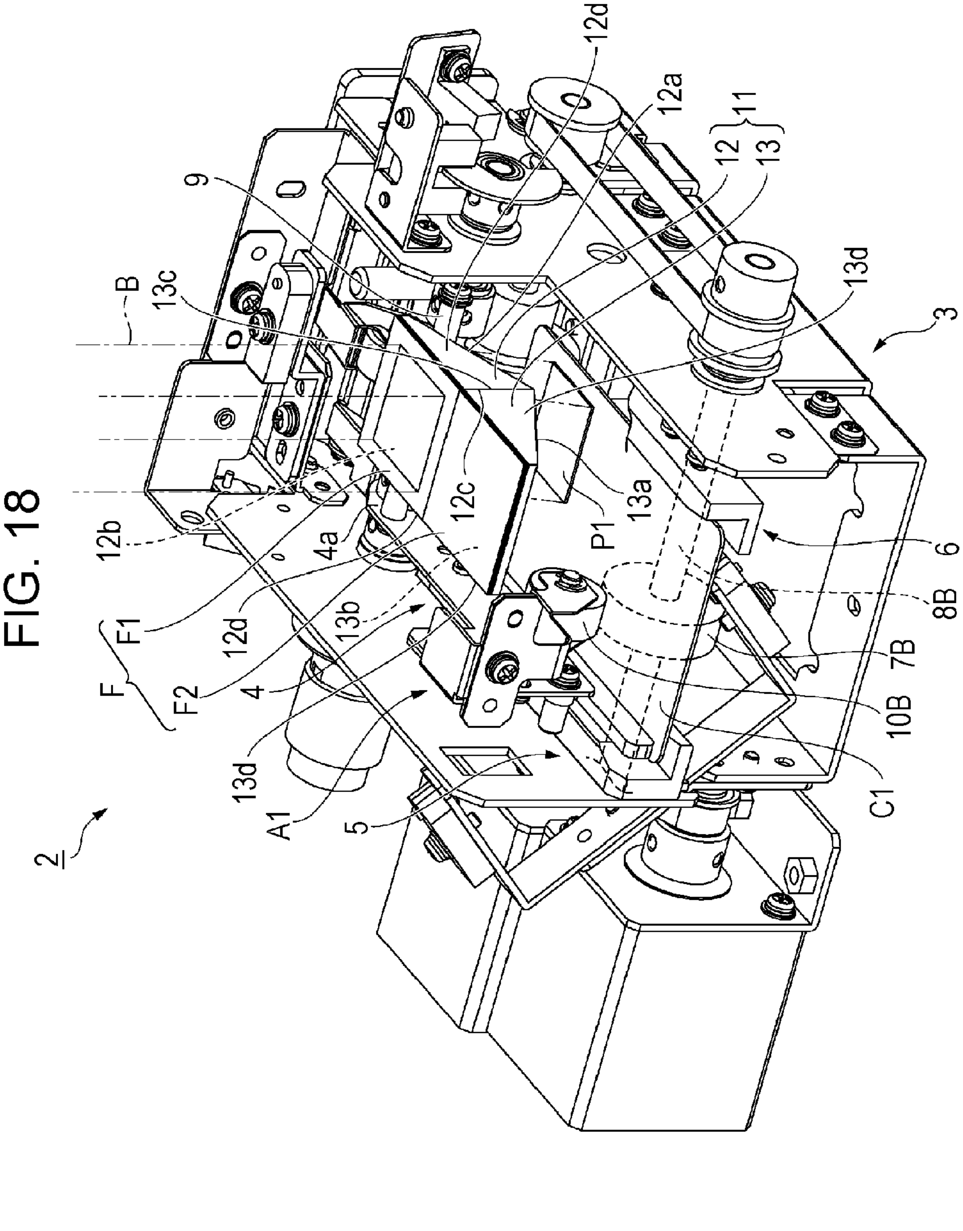
FIG. 18 is a perspective view illustrating a transport device of a laser marker according to a fourth embodiment of the present invention in a state in which a lenticular image is being printed in a lenticular portion by using a first prism portion.
Figure 19:
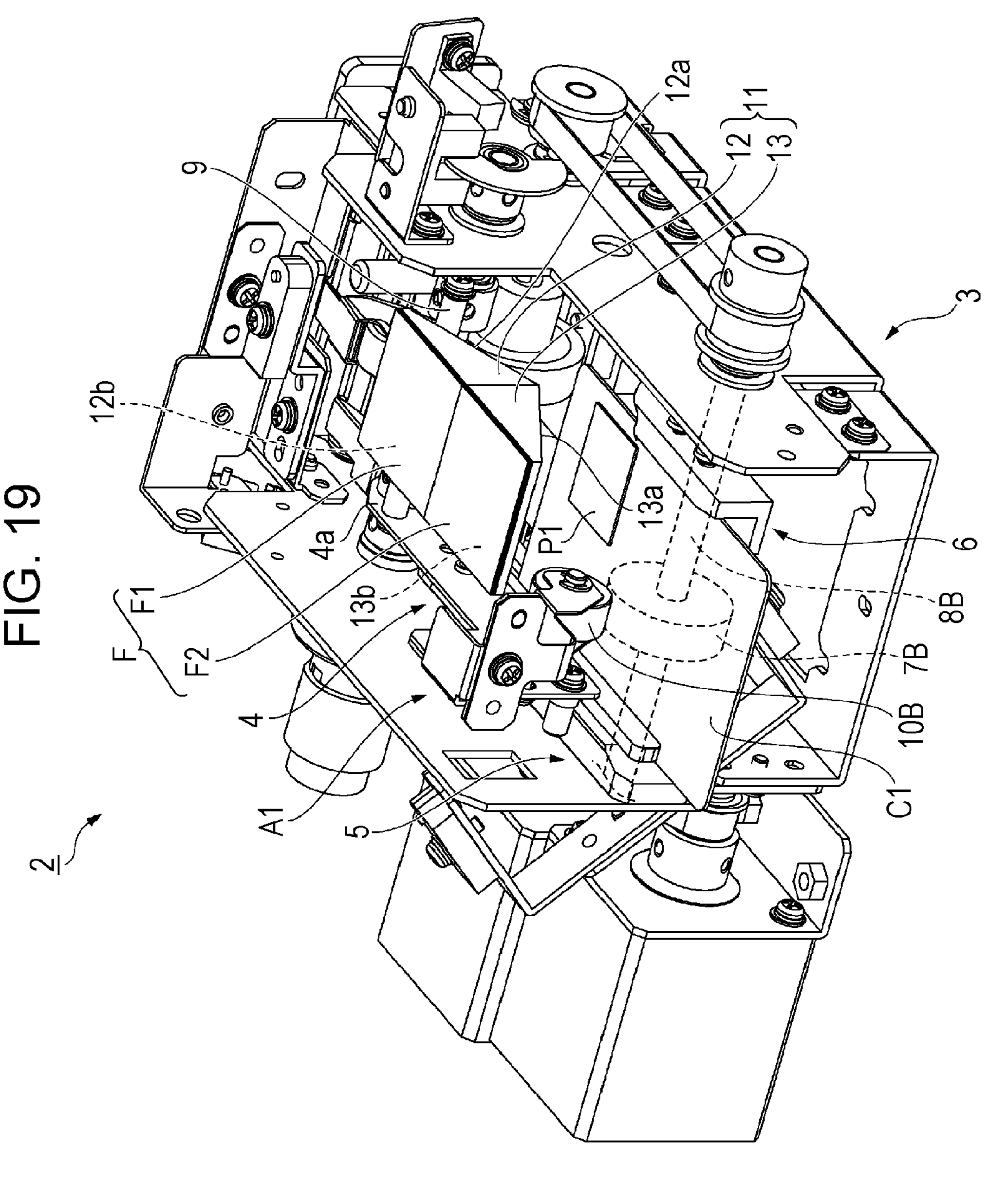
FIG. 19 is a perspective view illustrating a state in which the lenticular portion in FIG. 18 has been moved to the position of a second prism portion.
Figure 20:
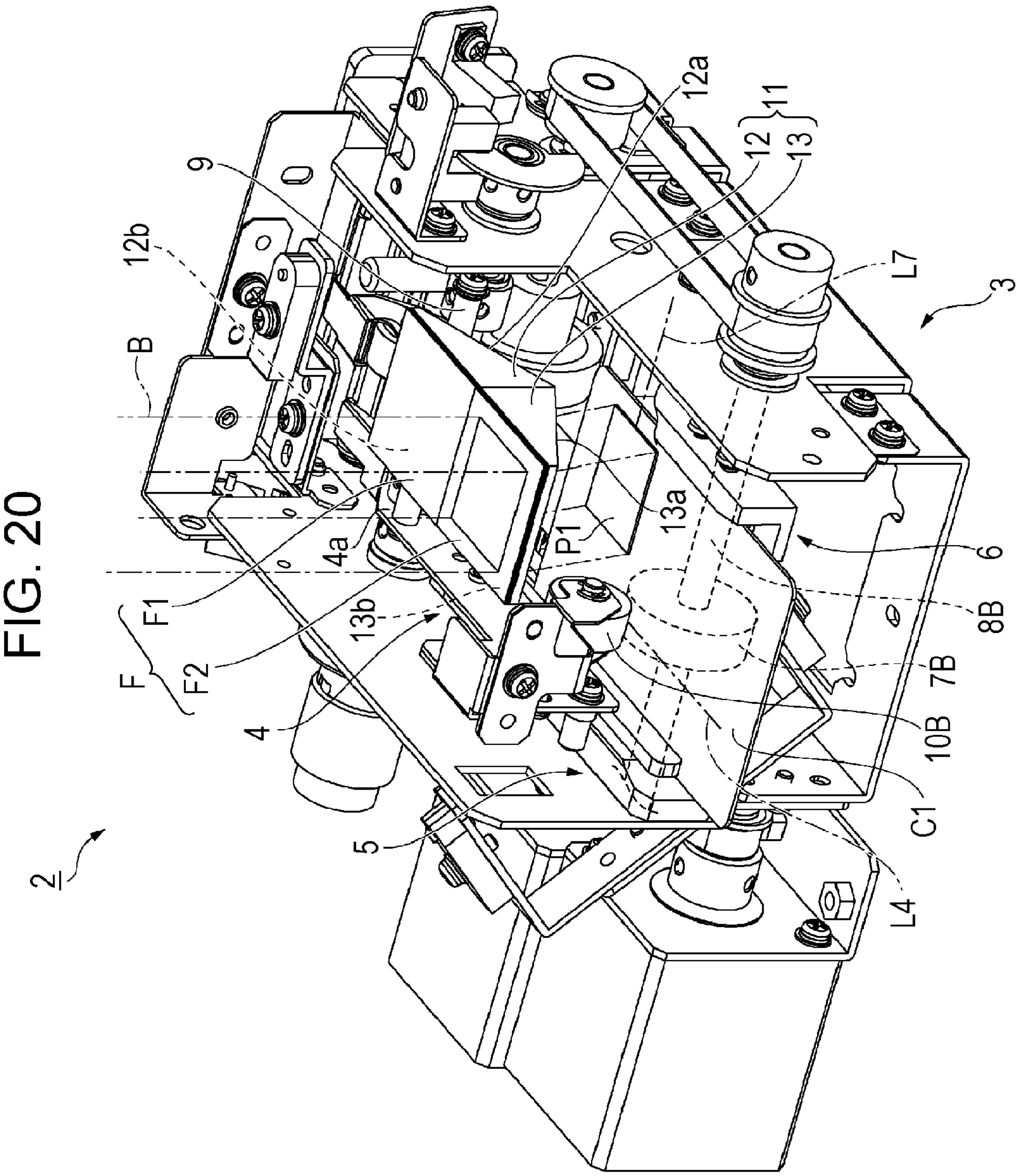
FIG. 20 is a perspective view illustrating a state in which a lenticular image is being printed in the lenticular portion by using the second prism portion in FIG. 19.

FIGS. 18 to 20 illustrate a transport device 2 according to a fourth embodiment. A laser marker 1 (see FIG. 1), which includes the transport device 2, prints a lenticular image and an ordinary image on a plastic card C1, which is an example of a sheet. The lenticular image is formed in a lenticular portion P1 of the card C1. The lenticular portion P1 is a portion of the card C1 on which a lenticular lens is formed. The lenticular lens is transparent and has a sheet-like shape. The lenticular image is formed under the lenticular lens. The lenticular portion P1 allows an image that is visible to change as the card C1 is tilted at different angles. The laser marker 1 includes a laser irradiation device 1B and a housing 1A. The laser irradiation device 1B emits a laser beam from a head 1*a*, which faces downward. The housing 1A is disposed in an upper part of the laser marker 1 and houses the laser irradiation device 1B. The laser irradiation device 1B can freely move a point that is irradiated with a laser in the horizontal direction by moving a scan mirror. The transport device 2 is disposed below the laser irradiation device 1B in the housing 1A. The transport device 2 transports the card C1 so that images can be printed on the card C1 with a laser beam emitted from the laser irradiation device 1B.

The transport device 2 includes a base unit 3 and a rotation member 4 (movable member). The base unit 3 is disposed so as to be substantially horizontal and supports the card C1. The rotation member 4 is connected to an upper portion of the base unit 3 so as to be rotatable. The rotation member 4 rotates between a holding position A1 and a withdrawn position A2. In the holding position A1, the rotation member 4 holds the card C1 in cooperation with the base unit 3. In the withdrawn position A2, the rotation member 4 is located outside of the optical path of a laser beam.

The base unit 3 includes a base plate 3*a*, side plates 3*b* and 3*c*, and a vertical cover plate 3*d*. The base plate 3*a* has a rectangular shape and is disposed in the housing 1A so as to be horizontal. The side plates 3*b* and 3*c* stand vertically on the long sides of the base plate 3*a*. The cover plate 3*d* is disposed adjacent to one of the short sides of the base plate 3*a* and extends perpendicular to the side plates 3*b* and 3*c*. A card slot 30 (see FIGS. 1 to 3) is formed in the cover plate 3*d*. The card C1 is inserted into the card slot 30 substantially horizontally. In the following description, it will be assumed that the card C1 is inserted toward the "front" side; and the terms "back", "left", and "right" refer to the sides with respect to the "front" side.

A rotation shaft 8A is disposed inward from and below the card slot 30 so as to extend in the left-right direction. The rotation shaft 8A extends through shaft bearing holes that are attached to the side plates 3*b* and 3*c*. The rotation shaft 8A is connected to a motor M1 through a timing belt that is disposed outward from the side plate 3*b*. A drive roller 7A is attached to the rotation shaft 8A. The drive roller 7A is in contact with a lower surface of the card slot 30. A pinch roller 10A is disposed above the drive roller 7A. The pinch roller 10A is rotatable around an axis that is substantially parallel to the rotation shaft 8A.

The pinch roller 10A is urged toward the drive roller 7A by a plate spring or the like. When the card C1 is inserted into the card slot 30, the pinch roller 10A presses the card C1 against the drive roller 7A. In this state, when the motor M1 rotates the drive roller 7A through the rotation shaft 8A, the card C1 is moved in the front-back direction as the drive roller 7A rotates, and the pinch roller 10A is rotated due to the movement of the card C1. Thus, the drive roller 7A and the pinch roller 10A cooperate to transport the card C1 in the front-back direction.

A pair of guide members 5 and 6 are disposed in front of the drive roller 7A so as to extend in the front-back direction. The guide members 5 and 6 are respectively attached to upper edges of the side plates 3*b* and 3*c*. The guide member 5 includes a support plate 5*a* and a guide wall 5*b*. The support plate 5*a* supports the right side of the card C1. The guide wall 5*b* protrudes upward from the support plate 5*a* and extends along the right side of the card C1. The guide member 6 includes a support plate 6*a* and a guide wall 6*b*. The support plate 6*a* supports the left side of the card C1. The guide wall 6*b* protrudes upward from the support plate 6*a* and extends along the left side of the card C1. The guide member 6 is urged toward the guide member 5 by a spring. Thus, the card C1 can be held between the guide wall 5*b* and the guide wall 6*b* without gaps therebetween, and therefore the position of the card C1 in the left-right direction can be determined with high accuracy. The guide member 5 and the guide member 6 cooperate to guide the card C1 along the front-back direction.

A rotation shaft 8B is disposed below the guide members 5 and 6 so as to extend parallel to the rotation shaft 8A. The rotation shaft 8B extends through shaft bearing holes that are attached to the side plates 3*b* and 3*c*. The rotation shaft 8B is connected to the rotation shaft 8A through a timing belt 24 that is disposed outward from the side plate 3*c*. A drive roller 7B is attached to the rotation shaft 8B. The drive roller 7B is disposed nearer to the guide member 5 than to the guide member 6 and is in contact with the lower surface of the card C1.

A rotation shaft 9 is disposed behind the guide members 5 and 6 so as to extend parallel to the rotation shafts 8A and 8B. The rotation shaft 9 extends through shaft bearing holes that are attached to the side plates 3*b* and 3*c*. The rotation member 4 is fixed to the rotation shaft 9. The rotation member 4 includes a pair of frames 4*a* and 4*b*. First ends of the frames 4*a* and 4*b* are fixed to the rotation shaft 9, and the frames 4*a* and 4*b* extend in a direction perpendicular to the rotation shaft 9. The frames 4*a* and 4*b* are parallel to each other. Second ends of the frames 4*a* and 4*b* are connected to each other through a connection shaft 4*c*. When the rotation member 4 is located in the holding position A1, the frames 4*a* and 4*b* respectively face the guide members 5 and 6.

The rotation shaft 9 is connected to a motor M2 through a timing belt that is disposed outward from the side plate 3*b*. When the motor M2 rotates the rotation shaft 9 clockwise as seen from the left side, the rotation member 4 is rotated so as to be separated from the guide members 5 and 6, and the rotation member 4 moves from the holding position A1 to the withdrawn position A2. When the motor M2 rotates the rotation shaft 9 counterclockwise as seen from the left side, the rotation member 4 is rotated so as to approach the guide members 5 and 6 from above, and the rotation member 4 moves from the withdrawn position A2 to the holding position A1.

A sensor 25 for detecting the state of rotation of the rotation shaft 9 is disposed outward from the side plate 3*c*. The sensor 25 includes a rotary plate 26 and photosensors 27 and 28. The rotary plate 26 is fixed to an end portion of the rotation shaft 9. The photosensors 27 and 28 are fixed to the side plate 3*c*. Each of the photosensors 27 and 28 includes a light emitter and a light receiver. Each of the photosensors 27 and 28 detects whether the rotary plate 26 is located between the light emitter and the light receiver depending on whether a light beam from the light emitter reaches the light receiver. The rotary plate 26 and the photosensors 27 and 28 are positioned so that the rotary plate 26 blocks passage of light beams in both of the photosensors 27 and 28 when the rotation member 4 has moved from the holding position A1 to the withdrawn position A2 and so that the rotary plate 26 does not block passage of light beams in both of the photosensors 27 and 28 when the rotation member 4 has moved from the withdrawn position A2 to the holding position A1.

A pinch roller 10B is disposed in the rotation member 4 at a position corresponding to that of the drive roller 7B. The pinch roller 10B is rotatable around an axis L3 that is substantially parallel to an axis L1 of the rotation shaft 8B of the drive roller 7B and to an axis L2 of the rotation shaft 9 of the rotation member 4. The pinch roller 10B is fixed to the frame 4*a* through a plate spring 23 using a screw. Because the drive roller 7B is disposed nearer to the guide member 5 than to the guide member 6, the pinch roller 10B is disposed nearer to the frame 4*a* than to the frame 4*b*. Thus, a sufficient space for installing a prism 11, which will be described below, is provided on the frame 4*b* side.

When the rotation member 4 is located in the holding position A1, the plate spring 23 urges the pinch roller 10B toward the drive roller 7B. Therefore, the pinch roller 10A presses the card C1, which is disposed on the drive roller 7B, against the drive roller 7A. When the rotation shaft 8B rotates the drive roller 7B in this state, the card C1 is moved along the guide members 5 and 6 as the drive roller 7B rotates, and the pinch roller 10B is rotated due to the movement of the card C1. Thus, the pinch roller 10B and the drive roller 7B cooperate to transport the card C1 along the guide members 5 and 6. Thus, when printing an image, the position of the card C1 on the guide members 5 and 6 is adjusted, and when the image has been printed, the card C1 is transported forward from the guide members 5 and 6.

The prism 11 is disposed between the frame 4*a* and the frame 4*b*. A neutral density (ND) filter F, which attenuates the intensity of light without affecting the color of the light, is disposed on a laser-beam-incident surface of the prism 11. The ND filter F is not fixed to the surface of the prism 11 using an adhesive. Instead, a frame (not shown) that surrounds the ND filter F and holds the ND filter F is fixed to side surfaces 12*d* and 13*d* of the prism 11 using screws, and thereby the ND filter F is disposed on the surface of the prism 11. An adhesive is not used in order to avoid the influence of the refractive index of the adhesive. An appropriate range of the light-intensity attenuation rate of the ND filter F is 40% to 60%.

The prism 11 is fixed to the frame 4*b*. The prism 11 includes a first right-angle prism 12 (first prism portion) and a second right-angle prism 13 (second prism portion), which are arranged side by side along the front-back direction, that is, along a transport direction L4 in which the pinch roller 10B transports the card C1. The first right-angle prism 12 is disposed on the back side of the second right-angle prism 13. The first right-angle prism 12 has perpendicular surfaces 12*b* and 12*c*, which extend perpendicular to each other; an inclined surface 12*a*, which diagonally intersects the perpendicular surfaces 12*b* and 12*c*; and the pair of side surfaces 12*d*. The right-angle prism 12 is disposed so that, when the rotation member 4 is in the holding position A1, the perpendicular surface 12*b* extends horizontally and faces upward, the perpendicular surface 12*c* faces forward, and the inclined surface 12*a* faces downward and backward. The second right-angle prism 13 is disposed on the front side of the first right-angle prism 12. The second right-angle prism 13 has perpendicular surfaces 13*b* and 13*c*, which extend perpendicular to each other; an inclined surface 13*a*, which diagonally intersects the perpendicular surfaces 13*b* and 13*c*; and a pair of side surfaces 13*d*. The right-angle prism 13 is disposed so that, when the rotation member 4 is in the holding position A1, the perpendicular surface 13*b* extends horizontally and faces upward, the perpendicular surface 13*c* faces backward, and the inclined surface 13*a* faces downward and forward. The right-angle prisms 12 and 13 are disposed so that the perpendicular surfaces 12*c* and 13*c* are in close contact with each other. First and second ND filters F1 and F2 are respectively disposed on the perpendicular surfaces 12*b* and 13*b*, that is, the laser-beam-incident surfaces of the prism portions 12 and 13. The ND filters F1 and F2 are respectively fixed to the side surfaces 12*d* and 13*d* of the prism portions 12 and 13 through frames (not shown) using screws.

A method of printing an image by using the laser marker 1, which has the structure described above, will be described. First, the card C1 is inserted into the card slot 30 in a state in which the lenticular portion P1 faces upward and the long sides of the card C1 extend in the front-back direction. Then, the drive roller 7A and the pinch roller 10A cooperate to transport the card C1 to a position on the guide members 5 and 6. At this time, the rotation member 4 is located in the holding position A1. Next, as illustrated in FIG. 18, the drive roller 7B and the pinch roller 10B cooperate to transport the card C1 so that the lenticular portion P1 of the card C1 is located under the first right-angle prism 12. Then, the laser irradiation device 1B emits a laser beam B from the head 1*a* toward the first right-angle prism 12. The laser beam B passes through the first ND filter F1, enters the first right-angle prism 12, is refracted forward by the inclined surface 12*a*, which faces downward and backward, and reaches the lenticular portion P1.

Next, as illustrated in FIG. 19, the drive roller 7B and the pinch roller 10B cooperate to transport the card C1 so that the lenticular portion P1 is located under the second right-angle prism 13. Then, as illustrated in FIG. 20, the laser irradiation device 1B emits a laser beam B from the head 1*a* toward the second right-angle prism 13. The laser beam B passes through the second ND filter F2, enters the second right-angle prism 13, is refracted backward by the inclined surface 13*a*, which faces downward and forward, and reaches the lenticular portion P1. Thus, the lenticular portion P1 is irradiated with the laser beams B that have been refracted in two directions, that is, forward and backward. Therefore, a lenticular image whose appearance changes as the card C1 is tilted around an axis L7 that is perpendicular to the transport direction L4 is printed.

Next, the drive roller 7B and the pinch roller 10B cooperate to transport the card C1 so that the position of the card C1 is adjusted to a position for printing an ordinary image. Then, the rotation member 4 is withdrawn to the withdrawn position A2 by rotating the rotation shaft 9, and the laser irradiation device 1B directly irradiates the upper surface of the card C1 with a laser beam emitted from the head 1*a*. The laser beam is vertically incident on the upper surface of the card C1 and an ordinary image is printed.

In the state in which the rotation member 4 is in the withdrawn position A2, the lenticular portion P1 may be directly irradiated with a laser beam. By doing so, the lenticular portion P1 is irradiated with laser beams from three directions, and therefore a lenticular image whose appearance changes to a larger degree as the card C1 is tilted can be printed.

With the laser marker 1 described above, when the rotation member 4 is in the holding position A1, a lenticular image can be printed by irradiating the card C1 with a laser beam at an angle by refracting the laser beam with the prism 11, which is fixed to the rotation member 4. When the rotation member 4 is in the withdrawn position A2, an ordinary image can be printed by irradiating the card C1 with a laser beam that has not passed through the prism 11. Because a lenticular image and an ordinary image can be printed without tilting the card C1, it is not necessary to provide a mechanism for tilting the card C1. Therefore, the laser marker 1 can be reduced in size. In particular, the rotation member 4, which moves the prism 11 between a position in the optical path of the laser beam and a position outside of the optical path of the laser beam, rotates between the holding position A1 and the withdrawn position A2. Therefore, a mechanism for moving the rotation member 4 can be made simpler easily, and the laser marker 1 can be further reduced in size. Moreover, when the rotation member 4 is moved so as to withdraw the prism 11 to a position outside of the optical path of a laser beam, the pinch roller 10B is also withdrawn to a position outside of the optical path of a laser beam. Therefore, an ordinary image can be printed without being hindered by the pinch roller 10B. Because only one rotation member 4 is used to withdraw the pinch roller 10B and to withdraw the prism 11, the laser marker 1 can be further reduced in size.

The prism 11 includes the right-angle prisms 12 and 13 for refracting laser beams in different directions. The right-angle prisms 12 and 13 are arranged side by side along the transport direction L4, in which the pinch roller 10B transports the card C1. Thus, only by transporting the card C1 by using a simple mechanism having the drive roller 7B and the pinch roller 10B, the card C1 can be moved quickly to positions corresponding to those of the right-angle prisms 12 and 13. Therefore, the card C1 can be irradiated with laser beams that have passed through the right-angle prisms 12 and 13 and have been refracted in different directions, and therefore a lenticular image whose appearance changes to a large degree can be printed quickly. Moreover, because the card C1 is transported by using a simple mechanism having the drive roller 7B and the pinch roller 10B, the laser marker 1 can be reduced in size.

The axis L1 of the drive roller 7B and the axis L3 of the pinch roller 10B are parallel to the axis L2 of the rotation shaft 9 of the rotation member 4. Therefore, even when the holding position A1 of the rotation member 4 becomes displaced in the up-and-down direction due to variation in the thickness of the card C1, the parallelism between the pinch roller 10B and the card C1 is maintained, and therefore the peripheral surface of the pinch roller 10B comes into close contact with the upper surface of the card C1. Moreover, the card C1 can be prevented from being displaced in a direction that intersects the transport direction L4 of the pinch roller 10B, when the rotation member 4 rotates and reaches the holding position A1 and the pinch roller 10B comes into contact with the card C1. Therefore, the card C1 can be transported with high accuracy in the transport direction L4, and the lenticular portion P1 of the card C1 and the prism 11 can be positioned relative to each other with high accuracy. Because the right-angle prisms 12 and 13 of the prism 11 are arranged side by side along the transport direction L4, by transporting the card C1 with high accuracy in the transport direction L4, the lenticular portion P1 of the card C1 and the right-angle prisms 12 and 13 can be positioned relative to each other with high accuracy.

With the laser marker 1, when forming an image in the lenticular portion P1, the power of the laser beam can be attenuated by the ND filters F1 and F2. Therefore, the laser can be used in a high power range, in which the power of the laser is stable and a clear image can be easily formed, instead of in a low power range, in which the power of the laser tends to be unstable. In addition, also when printing an image in a non-lenticular portion of the card C1, it is preferable that the laser be used in a high power range. Therefore, images can be formed in the lenticular portion P1 of the card C1 and in the non-lenticular portion of the card C1 with the same laser power. As a result, it is not necessary to change the laser power every time when the printing portion is switched between the lenticular portion P1 of the card C1 and the non-lenticular portion of the card C1, and therefore printing can be performed rapidly.

Next, the relationship between the ND filter and a laser beam in forming an image of a facial portrait in the lenticular portion P1 will be described on the basis the result of an experiment.

A laser device having a maximum laser power of 1 W was used as the laser irradiation device 1B, and a ND filter having the light-intensity attenuation rate of 40% was used as the ND filter F.

In a case where the laser power was 70% of the maximum power and the ND filter F was not used, regarding an image of a facial portrait formed in the lenticular portion P1, although the laser power was in a stable range, the facial portrait was dark as a whole, the contrast of the face was unclear, and the recognizability of the face was low.

In a case where the laser power was 20% of the maximum power and the ND filter F was not used, regarding an image of a facial portrait image formed in the lenticular portion P1, the laser power was in an unstable range, the contrast of the portrait was nonuniform as a whole and was slightly dark, the contrast of the face was unclear, and the recognizability of the face was low.

In a case where the laser power was 70% of the maximum power and the ND filter F was used, regarding an image of a facial portrait formed in the lenticular portion P1, the laser power was in a stable range, the contrast of the face was clear, and the recognizability of the face was high.

Thus, it was confirmed in the experiment that, when forming an image whose recognizability depends on the contrast of the image in the lenticular portion P1, a good result can be obtained by adjusting the contrast of the image not by adjusting the power of a laser beam but by using the ND filter F. That is, this is not merely an application a technology of adjusting the intensity of a laser beam by using a ND filter. As can be seen from the result of the experiment, it was found that a significant effect can be obtained when forming an image whose recognizability depends on the contrast of the image, such as a facial portrait, in the lenticular portion P1.

The present invention is not limited to the embodiments described above, and can be modified in various ways within the spirit and scope of the present invention.

For example, ND filters may be disposed on the inclined surfaces 12*a* and 13*a* of the first and second right-angle prisms 12 and 13, that is, on the laser-beam-exit surfaces.

ND filters may be disposed on the laser-beam-incident surfaces or the laser-beam-exit surfaces of the first and second right-angle prisms 15 and 16. ND filters may be disposed on the laser-beam-incident surfaces or the laser-beam-exit surfaces of the third and fourth right-angle prisms 21 and 22.

A ND filter F that is fixed to a frame may be disposed between the laser irradiation device 1B and the lenticular portion P1 of the card C1, and an image may be formed in the lenticular portion P1. In a case where the prism 11 is not used, a ND filter F that is fixed to a frame may be disposed between the laser irradiation device 1B and the lenticular portion P1 of the card C1, and an image may be formed in the lenticular portion P1 while tilting the card C1.

The present invention is not limited to the embodiments that have been described above. For example, a sheet on which an image is to be printed is not limited to a card, and may be a passport, a sales slip, a bond sheet, or the like. It is not necessary that the prism have a plurality of prism portions. The prism may have only one prism portion. The plurality of prism portions may be integrated with each other. The process for printing an image is not limited to the method described above. For example, an ordinary image may be printed first, and then a lenticular image may be formed.

What is claimed is:

1. A laser marker for printing an image on a sheet by irradiating the sheet with a laser beam, the laser marker comprising:

a laser irradiation unit that irradiates the sheet with the laser beam;

a base unit that supports the sheet;

a drive roller that is provided in the base unit and that is in contact with a first surface of the sheet;

a movable member that rotates between a sheet holding position and a withdrawn position, the sheet holding position being a position in which the movable member holds the sheet in cooperation with the base unit, the withdrawn position being a position outside of an optical path of the laser beam;

a pinch roller that is provided in the movable member, that is in contact with a second surface of the sheet, and that transports the sheet in cooperation with the drive roller; and a prism that is fixed to the movable member and that transmits and refracts the laser beam when the movable member is in the sheet holding position, wherein the laser irradiation unit irradiates the sheet with the laser beam when the movable member is in the sheet holding position and when the movable member is in the withdrawn position.

2. The laser marker according to claim 1, wherein the prism includes a plurality of prism portions that refract the laser beam in different directions, the plurality of prism portions being arranged side by side along a transport direction in which the pinch roller transports the sheet.

3. The laser marker according to claim 1, wherein the movable member is provided in a plurality, the plurality of movable members are disposed so that the sheet holding positions thereof overlap each other, and the plurality of movable members rotate in different directions.

4. A laser marker for forming an image in a lenticular portion of a sheet by irradiating the sheet with a laser beam, the lenticular portion allowing an image that is visible to change as the sheet is viewed from different angles, the laser marker comprising:

a laser irradiation device irradiating the lenticular portion of the sheet and a non-lenticular portion of the sheet with the laser beam; and a neutral density filter that is disposed between the lenticular portion and the laser irradiation device, the neutral density filter transmitting the laser beam;

wherein the laser irradiation device irradiates the lenticular portion of the sheet with the laser beam through the neutral density filter, and the laser irradiation device directly irradiates the non-lenticular portion of the sheet with the laser beam, and wherein images are formed in the lenticular portion and the non-lenticular portion of the sheet with substantially equal laser power.

5. The laser marker according to claim 4, further comprising:

a prism that is disposed between the lenticular portion and the laser irradiation device, the prism causing the lenticular portion to be irradiated with the laser beam at an angle, wherein the neutral density filter is disposed on a laser-beam-incident surface of the prism or on a laser-beam-exit surface of the prism.

6. The laser marker according to claim 2, wherein the movable member is provided in a plurality, the plurality of movable members are disposed so that the sheet holding positions thereof overlap each other, and the plurality of movable members rotate in different directions.

* * * * *